(12) United States Patent
Van Der Kolk et al.

(10) Patent No.: US 12,545,990 B1
(45) Date of Patent: Feb. 10, 2026

(54) DOPED DLC FOR BIPOLAR PLATE (BPP)

(71) Applicant: IHI IONBOND AG, Dulliken (CH)

(72) Inventors: Gerrit Jan Van Der Kolk, Venlo (NL); Ivailo Simeonov Dolchinkov, Trimbach (CH); David Kolenatý, Horovice (CZ); Antonius Petrus Arnoldus Hurkmans, Boxmeer (NL)

(73) Assignee: IHI Ionbond AG, Dulliken (CH)

( * ) Notice: Subject to any disclaimer, the term of this patent is extended or adjusted under 35 U.S.C. 154(b) by 0 days.

(21) Appl. No.: 18/043,487

(22) PCT Filed: Sep. 3, 2021

(86) PCT No.: PCT/EP2021/074363
§ 371 (c)(1),
(2) Date: Feb. 28, 2023

(87) PCT Pub. No.: WO2022/049245
PCT Pub. Date: Mar. 10, 2022

(30) Foreign Application Priority Data

Sep. 3, 2020 (EP) ..................................... 20194394

(51) Int. Cl.
*H01M 8/0213* (2016.01)
*C23C 14/06* (2006.01)
(Continued)

(52) U.S. Cl.
CPC ...... *C23C 14/0605* (2013.01); *C23C 14/0635* (2013.01); *C23C 14/325* (2013.01);
(Continued)

(58) Field of Classification Search
None
See application file for complete search history.

(56) References Cited

U.S. PATENT DOCUMENTS

| 3,428,541 | A | | 2/1969 | Froemel et al. |
| 5,643,343 | A | * | 7/1997 | Selifanov ................ B24D 3/02 51/306 |

(Continued)

FOREIGN PATENT DOCUMENTS

| CN | 104204274 A | 12/2014 |
| CN | 109338322 A1 | 2/2019 |

(Continued)

OTHER PUBLICATIONS

First Office Action of Chinese Patent Application No. 202180054723.8, dated Jan. 25, 2025, 8 pages.

(Continued)

*Primary Examiner* — Jason Berman
(74) *Attorney, Agent, or Firm* — Weston R. Gould; Dinsmore & Shohl LLP

(57) ABSTRACT

The present invention relates to a metallic bipolar plate comprising a metal substrate and at least one layer of a non-hydrogenated transition metal-doped diamond-like carbon (DLC) provided on the metal substrate, wherein the non-hydrogenated DLC comprises at least one transition metal selected from groups 4d, 5d and 6d of the periodic table of elements and a part of the at least one transition metal is present in the form of carbide of the at least one transition metal in the non-hydrogenated DLC as a matrix. The non-hydrogenated transition metal-doped DLC has an indentation hardness of ≥35 GPa, preferably of ≥40 GPa. The metal-doped DLC used as a coating of metallic bipolar plates in fuel cells and electrolyzers exhibits high corrosion resistance and low interface contact resistance even for longer lifetimes (>10,000 hours) and harsh operational conditions. Therefore, the present invention also pertains to such uses, and also to fuel cells, in particular proton exchange membrane fuel cells, and electrolyzers comprising such coated metallic bipolar plates. Further, the present (Continued)

invention provides a cathodic arc discharge deposition method for depositing a coating of non-hydrogenated DLC comprising at least one of the above-mentioned transition metals, which is preferably the non-hydrogenated transition metal-doped DLC.

20 Claims, 7 Drawing Sheets

(51) Int. Cl.
  *C23C 14/32* (2006.01)
  *C25B 9/75* (2021.01)
  *H01J 37/32* (2006.01)
  *H01M 8/0206* (2016.01)
  *H01M 8/0228* (2016.01)

(52) U.S. Cl.
  CPC .......... *C25B 9/75* (2021.01); *H01J 37/32055* (2013.01); *H01M 8/0206* (2013.01); *H01M 8/0213* (2013.01); *H01M 8/0228* (2013.01)

(56) References Cited

U.S. PATENT DOCUMENTS

| | | | |
|---|---|---|---|
| 5,799,549 | A | 9/1998 | Decker et al. |
| 6,331,332 | B1 | 12/2001 | Wang |
| 2002/0102398 | A1* | 8/2002 | Shi ..................... C23C 14/0605 419/48 |
| 2004/0005502 | A1* | 1/2004 | Schlag ................... C23C 16/27 427/122 |
| 2005/0233551 | A1* | 10/2005 | Bergstrom ........ H01L 21/02576 257/E21.091 |
| 2007/0188104 | A1 | 8/2007 | Chistyakov |
| 2009/0065350 | A1 | 3/2009 | Anders |
| 2015/0037710 | A1 | 2/2015 | Cooke et al. |
| 2015/0203777 | A1 | 7/2015 | Ramm |
| 2015/0368579 | A1 | 12/2015 | Taki |
| 2015/0376532 | A1 | 12/2015 | Hovsepian et al. |
| 2016/0053366 | A1 | 2/2016 | Stowell |

FOREIGN PATENT DOCUMENTS

| | | |
|---|---|---|
| CN | 110468374 A1 | 11/2019 |
| CN | 110797545 A1 | 2/2020 |
| JP | 2008-204876 A | 9/2008 |
| JP | 2008-297171 A | 12/2008 |
| WO | WO2000/68455 A1 | 11/2000 |

OTHER PUBLICATIONS

First Office Action of Chinese Patent Application No. 202180054724. 2, dated Dec. 31, 2024, 14 pages.
International Search Report for PCT/EP2021 /074364, Jan. 4, 2022.
Extended European Search Report, European Application No. 20194394. 1, Mar. 1, 2021.
Liang, C., et al., The influence of substrate bias voltages on structure, mechanical properties and anti-corrosion performance of Cr doped diamond-like carbon films deposited by steered cathodic arc evaporation, Thin Solid Films, 597: 88-96, 2015.
Jao, J., et al., Formation and characterization of DLC:Cr:Cu multi-layers coating using cathodic arc evaporation, Diamond and Related Materials, 18(2-3): 368-373, Feb. 1, 2009.
Zhou, B., et al., Structure and mechanical properties of Ni and Cr binary doped amorphous carbon coatings deposited by magnetron sputtering and pulse cathodic arc, Thin Solid Films, 701, 137942, Mar. 13, 2020.
Tang, X., et al., Mo doped DLC nanocomposite coatings with improved mechanical and blood compatibility properties, Applied Surface Science, 311: 758-762, Jun. 2, 2014.
Tamulevicius, S., Diamond like carbon nanocomposites with embedded metallic nanoparticles, Reports on Progress in Physics, 81(2): 24501, Jan. 5, 2018.
English translation of Notice of Reasons for Refusal for Japanese Patent Application No. 2023-514780, dated May 20, 2024.
English translation of Notice of Reasons for Refusal for Japanese Patent Application No. 2023-514781, dated May 20, 2024.
Pasaja, N., et al., Mo-containing tetrahedral amorphous carbon deposited by dual filtered cathodic vacuum arc with selective pulsed bias voltage, Nuclear Instruments and Methods in Physics Research B, 259: 867-870, 2007.
Vetter, J., 60 years of DLC coatings: Historical highlights and technical review of cathodic arc processes to synthesize various DLC types, and their evolution for industrial applications, Surface & Coatings Technology, 257: 213-240, 2014.
Show, et al., Electrically conductive amorphous carbon coating on metal bipolar plates for PEFC, Surface and Coatings Technology, 202(4-7): 1252-1255, Nov. 13, 2007.
Notice of Reasons for Refusal for Japanese Patent Application No. JP2023 514780, issued Jan. 24, 2025, 9 pages.
Notice of Reasons for Refusal for Japanese Patent Application No. JP2023 514781, issued Jan. 24, 2025, 8 pages.

* cited by examiner

DOPED DLC FOR BIPOLAR PLATE (BPP)

This application is a U.S. National Stage of International Application No: PCT/EP2021/074363 filed Sep. 3, 2021, and which depends from and claims priority to European Patent Application No: EP20194394.1 filed Sep. 3, 2020, the entire contents of which are incorporated herein by reference.

DESCRIPTION

Field of the Invention

The present invention relates to non-hydrogenated transition metal-doped diamond-like carbon (DLC) and a layer system comprising a coating thereof provided on a substrate. Moreover, the present invention is concerned with a fuel cell, in particular a proton exchange membrane fuel cell (PEMFC), and an electrolyzer comprising a metallic bipolar plate, which has a coating of the non-hydrogenated transition metal-doped DLC according to the present invention, as well as the corresponding uses of a layer system. Finally, the present invention relates to a method of depositing a coating of non-hydrogenated DLC, which is a cathodic arc discharge deposition method, the coating preferably being a coating of the non-hydrogenated transition metal-doped DLC according to the present invention.

Background of the Invention

Diamond-like carbon (DLC) is a metastable form of amorphous carbon. DLC films have found widespread applications in science and technology. J. Robertson, in Materials Science and Engineering R 37, 2002, 129-281 provides a comprehensive overview of the material and its applications. As reported by Robertson, a distinction needs to be made between hydrogenated and non-hydrogenated forms of DLC. Another criterion for the classification of DLCs is the fraction of $sp^3$ bonding. If for non-hydrogenated material the fraction of $sp^3$ bonding reaches a high degree, the material is generally denoted as tetrahedral amorphous carbon, abbreviated as ta-C.

S. Xu et al. in Philosophical Magazine Part B, 76:3, 351-361 report the deposition of ta-C films by the filtered cathodic vacuum arc technique on silicon at room temperature. High $sp^3$ bond fractions (about 80% or higher) were obtained. Compressive stresses in the range of 7.5 to 12 GPa and hardnesses of 20 to 55 GPa were found. The maximum hardness was found to coincide with the highest $sp^3$ fraction as determined by electron-energy-loss spectroscopy (EELS).

Doped carbon coatings have also been developed. A. Abou Gharam et al. in Surface and Coatings Technology 206 (2011), 1905-1912 study the high temperature tribological behavior of W-DLC against aluminum. The W-DLC coatings were deposited using a physical vapor deposition (PVD) system. The addition of W to hydrogenated DLC resulted in the reduction of the friction coefficient in the temperature range of 400° C. to 500° C. The problem is, that doping of hydrogenated DLC, e.g. with W, takes place at an atomic level by sputtering. Non-hydrogenated DLC (ta-C) has a better wettability against a number of lubricants and a better temperature stability than hydrogenated DLC.

Z. Wang et al., International Journal of Hydrogen Energy 42 (2016), 5783-5792 deposited W doped carbon on stainless steel substrates. They used a close-field unbalanced magnetron sputtering ion plating (CFUBMSIP) system with a bias voltage of −60 V. The CFUBMSIP system was equipped with one tungsten (W) target, two graphite targets, and, for the deposition of a thin Cr seed layer and a thin intermediate MCx layer (M being Cr and W), with one chromium (Cr) target.

K. Hou et al. deposited niobium (Nb)-doped amorphous carbon (a-C) films on stainless steel substrates. Like Z. Wang et al. in the above-mentioned scientific article, they used a CFUBMSIP system. The bias voltage was −100 V. The CFUBMSIP system was equipped with one Nb target, two graphite targets, and moreover one titanium target. Niobium carbide is claimed to be embedded in the a-C matrix, and the presence of pure niobium is reported. Simulated first principle calculations assuming one Nb atom in the supercells gave simulation results suggesting a $sp^3$ fraction of about 58%. From the fitting of XPS data, a $sp^3$ fraction of up to 54% was derived. The maximum $sp^3$ fraction of 54% was however obtained for a film, in which the cathode current of the Nb cathode was kept at zero, so no Nb sputtered from the target. The Raman results for the Nb-doped a-C films however suggest lower $sp^3$ fractions. In particular, the $I_D/I_G$ ratios of about 2.5 suggest this when considering the teaching of A. C. Ferrari in Diamond and Related Materials 11 (2002), 1053-1061. No hardness data are reported in the article by K. Hou et al.

D. Zhang et al. (Carbon 145 (2019), 333-344) have doped amorphous carbon films with silver (Ag) or co-doped the films with Ag and chromium using a CFUBMSIP system. They have seen that the higher percentages of dopant resulted in a lower hardness and graphitization. They report a simulated hardness showing rather high hardness values. For pure C, their simulation shows a simulated hardness of 56 GPa. However, their measurements showed a compressive stress for all doped C-coatings between 2.40 and 3.37 GPa.

M. Andersson et al. (Vacuum 86 (2012), 1408-1416) deposited and characterized magnetron sputtered amorphous Cr—C films. They used non-reactive DC magnetron sputtering from elemental targets. The films were found to be X-ray amorphous with no presence of crystallites. They report a hardness of 6.9 GPa for a Cr dopant level of about 15 at. % (i.e. atomic %) increasing to 10.6 GPa for about 75 at. % Cr.

Y. Lin and S. Zhang in J. Nanosci. Nanotechnol. 16 (2016), 12720-12725) studied the effect of Cr addition on the properties of graphite-like carbon (GLC) films. The films are deposited by unbalanced magnetron sputtering. They report a hardness of 10.4 GPa for pure C and of up to 17.4 GPa for GLC films doped with Cr. Dopant levels are not expressly mentioned but for the Cr target power increasing from 0.1 kW to 0.3 kW and for carbon increasing from 0 to 5 kW, fairly low dopant levels can be expected.

A. Amanov et al. (Tribology International 62 (2013), 49-57) deposited Cr-doped and non-doped DLC films using unbalanced magnetron sputtering (UBMS). They report a hardness of 22.47 GPa for Cr-doped DLC, and of 10.75 GPa for non-doped DLC.

A. Ya. Kolpakov et al. (Nanotechnologies in Russia, 5 (2010), 160-164 employ a pulse vacuum arc method to deposit ta-C coatings doped with nitrogen, tungsten or aluminum. The level of dopant, such as tungsten, is not mentioned, nor the amount of W in the composite graphite-based cathode. The repetition frequency of pulses in the pulse vacuum arc method was 2.5 Hz. The doped carbon coatings are described as amorphous in structure and without crystalline impurities. For the W-doped films, microhardnesses HV of up to below 20 GPa were found. There is no evidence for pure W droplets found. The usage of arc discharge to create ta-C has also been described by R. H. Horsfall, Proc. Soc. Vacuum Coaters (1998), 60-85 using a DC arc discharge. Pulsed discharges to create ta-C have also been described V. N. Inkin et al., Diamond and Related Materials 13 (2004), 1474-1479.

Summarizing, with unbalanced magnetron sputtering excluding filters to filter the uncharged particles, a hardness for pure C is rather low, so far reported in the range of 20 GPa, whereas adding a substantial level of dopant, typically in the range of 10 at. % or higher shows an increase of hardness, caused by the higher percentages of Carbides going up to a hardness of about 22.5 GPa such as in the above-mentioned scientific article by A. Amanov et al.

As mentioned above, DLC films have found various applications in Science and Technology. Amorphous carbon films were also studied by some researches as protective coatings for bipolar plates (BBPs) in polymer electrolyte membrane (PEM) or proton exchange membrane (PEM) fuel cells (PEMFCs). BPPs have vital functions in PEMFCs and PEMFC stacks. For instance, they separate individual cells in a PEMFC stack, distribute the fuel gases and separate them, act as current collectors, facilitate heat and water removal, provide mechanical support for other components, and act as backbone or the core component of the FC stack.

For instance, Z. Wang et al., in the above-mentioned scientific article, deposited W-doped carbon by means of CFUBMSIP on austenitic stainless steel substrates and studied the interface contact resistance (ICR) and the corrosion resistance. They observed that a dopant level of W in between 2.54 at. % and 24.41 at. % increased the corrosion resistance. They obtained the best results for 2.54 and 8.56 at. %. They ascribe the corrosion protection to the formation of a tungsten oxide layer.

D. Zhang et al. in the above-cited scientific paper found that amorphous carbon (a-C) films doped with Ag and Cr simultaneously achieve low ICR. Moreover, their tests showed a lifetime improvement with less corrosion and less out-diffusion when used as coatings on metallic BPPs with dopant levels of 4.89 at. % Ag and 12.37 at. % Cr.

P. Yi et al. in International Journal of Hydrogen Energy 44 (2019), 6813-6843 provide a review of carbon-based coatings for metallic BPPs used in PEMFCs. Transition metal carbide (TMC) coatings are also mentioned in this review article.

By way of background, Fuel Cells and also Electrolyzers utilizing Polymer Electrolyte Membrane (PEM) have bipolar plates (BPPs), consisting of two halves that are welded or glued together at the edge of the plates. In between the bipolar plates and the PEM membrane a gas diffusion layer (GDL) is mounted. The GDL is normally a woven graphite fiber sheet. At the anode side the gas diffusion layer should transport electrons to the BPP, at the cathode side from the BPP to the gas.

In both cases there is a first requirement that the ICR between BPP and GDL is low, as well as the electrical resistance for currents from one side of the BPP to the other side. A second requirement is that the bipolar plate should not corrode, resulting in an increase of the ICR. A third requirement is that the BPP does not emit ions, that might pollute the catalyst near the PEM membrane. In some cases, the second and third requirement are related, as the emitted ions may be a product of the corrosion process.

For different applications different lifetimes are required. Mass volume passenger automotive targets operational lifetimes in the range of 5,000 to 8,000 hours.

Trucks will need to reach 20,000 to 30,000 hours. Preferably, trucks should even reach an operational lifetime of 50,000 hours. For applications like trains and Electrolyzers even longer lifetimes are required. The protection that coatings provide depends on the fuel cell Voltage. Higher Voltages result in quicker oxidation and out-diffusion. For automotive applications of fuel cells, high voltage can also occur due to peak voltage during start and stop situations. Therefore, coatings providing good protection at high fuel cell voltage and varying non-steady fuel cell voltage are desired for such applications.

The key target data have been established by the USA Department of Energy (https://www.energy.gov/eere/fuel-cells/doe-technical-targets-polymer-electrolyte-membrane-fuel-cell-components, accessed on Nov. 19, 2019) and are:
ICR<10 mΩ·cm$^2$
cathode corrosion current<0.1 µA/cm$^2$
anode corrosion current<1 µA/cm$^2$ To cope with the above three conditions, coatings have been applied to metal BBPs, where corrosion simulations show that we can expect a lifetime well over 10,000 hrs.

Numerous coating examples can be found in literature, ranging from pure gold coatings, to metal-nitrides and carbon coatings. Gold coatings provide low resistivity and good protection but are expensive. Nitride coatings have limitations in conductivity.

Carbon coatings are now considered. Pure carbon coatings have been applied in small series by various suppliers, the lifetime required seems to be adequate for applications like mass volume automotive. Doped carbon coatings have also been developed. This is what we have seen above from the scientific articles by Z. Wang et al., D. Zhang et al. and K. Hou et al. and from the review article by P. Yi et al.

One disadvantage of soft Carbon coatings on BPPs in fuel cells (in particular PEMFCs) and electrolyzers found by the present inventors is that for longer lifetimes (>10,000 hrs) and severe operational circumstances (high Voltage during operation), such as in fuel cells for trucks and trains, and in electrolyzers, weakly bonded carbon is dissolved. More particularly, the weakly bonded carbon is dissolved over time and results ultimately in loss of corrosion protection and conductivity.

There was thus a demand for alternative and further improved coatings, which avoid the above problems in coatings of BPPs known from the literature and which in particular satisfy all of the three above-mentioned requirements of BPPs, namely, low ICR, no corrosion and no emission of ions even when used in electrolyzers or in fuel cells under longer lifetimes of the fuel cell typical for trucks and trains. In view of the prior art, there was a particular demand for coatings for metallic BPPs that further reduce the ICR and further improve the corrosion resistance, even when used in electrolyzers or fuel cells under such harsh operating conditions as summarized above.

DLC coatings have also found application in the industry to reduce friction and improve wear resistance. Generally hydrogenated diamond like carbon (a-C:H) has been applied for this purpose. Limitations of the usage of hydrogenated diamond like carbon are, the hardness, which is in the range of 20-35 GPa and the application temperature, which is limited to about 300° C. A further limitation is that the low friction depends on the presence of water. To improve the temperature stability, 4d, 5d or 6d transition metals elements like W are added to hydrogenated DLC. An additional effect of adding easily oxidizing transition elements like W, Ta, V to hydrogenated DLC is that the metal reacts with oxygen and adds lubricity at higher temperature. In the above-cited scientific article by A. Abou Gharam et al., it is shown that the addition of W to hydrogenated DLC results in reduction of the friction coefficient in the temperature range 400-500° C. The problem is, that adding dopants like W in hydrogenated DLC only takes place at an atomic level, by sputtering.

Physical and Chemical Vapor Deposition coatings (PVD and CVD including Plasma-Assisted Chemical Vapor Deposition, PACVD) and derivatives are used to enhance the performance of base materials. Performance improvements can be directed to improvement of for example the wear resistance, or reduction of the friction. To tailor the properties of the coatings, one can dope the coatings with additional elements, can alter the composition, texture, internal stress level. Generally doped coatings have been widely applied in the last 20 years. A lot of experiments have been done on the performance of transition metal doped hydrogenated DLCs (a-C:H:Me), for an overview see S. Yazawa et al., Lubricants 2 (2014), 90-112. A beneficiary effect of the addition of a transition metals is, that generally elements like W and Mo form sulfides, with good lubrication properties. Both for elements in contact with fuel and in contact with lubricants this may play a role, as these may contain sulfur. Furthermore, W has shown to have a beneficial effect on the friction coefficient for contacts lubricated with molybdenum dithiocarbamate (MODTC). A reference for the beneficial effect of tungsten built in in a DLC layer against different lubricants is given in B. Vengudusamy et al., Tribology International 54 (2012), 68-76. In WO 2014/000994 A1, a method is described to bring in W into a hydrogenated diamond like carbon coating by usage of a metallo-organic precursor. The main reason to apply this was to increase the deposition rate in the process.

In all above described methods, the transition metal elements are in the plasma phase at atomic level, the atoms will arrive at the surface mainly as single atoms. As there is in the above described experiments a parallel flow of Carbon, the transition metal will be built atomically into the a-C:H coating, whereby the transition metal is bonded to carbon, forming a carbide. A detailed description of e.g. Ti built into hydrogenated DLC (a-C:H) is given in W. J. Meng et al., J. of Appl. Phys. 88, (2000), 2415-2422.

In summary, there is a large interest in industry to provide a coating material, which has outstanding properties as a coating of BPPs in fuel cells, in particular, PEMFCs providing the above-mentioned advantages for longer lifetimes and harsh conditions in operation, as well as for electrolyzers.

SUMMARY OF THE INVENTION

Non-Hydrogenated Transition Metal-Doped DLC

The present application satisfies these needs by providing a non-hydrogenated transition metal-doped diamond-like carbon (DLC) as defined in claim 1. Accordingly, the non-hydrogenated DLC comprises at least one transition metal selected from groups 4d, 5d and 6d of the periodic table of elements and a part of the at least one transition metal is present in the form of carbide of the at least one transition metal in the non-hydrogenated DLC as a matrix. The non-hydrogenated transition metal-doped DLC is characterized in that it has a hardness of ≥35 GPa, preferably of ≥40 GPa, wherein the hardness is measured on a film of the non-hydrogenated transition metal-doped DLC deposited on a polished substrate with an indentation depth less than 10% of the thickness of the film.

In the present application, the non-hydrogenated transition metal-doped DLC as defined in claim 1 for use in the present invention will occasionally be referred to for brevity as "doped DLC according to the present invention". The transition metal selected from groups 4d, 5d and 6d present in the doped DLC according to the present invention is sometimes referred to herein for simplicity as "the transition metal" or abbreviated as "TM".

The preamble of claim 1 is formulated in view of the scientific article by Z. Wang et al., according to which amorphous WC was observed, and the scientific article by K. Hou et al., according to which NbC phases were observed. However, the W-doped carbon films of Z. Wang et al. and the Nb-doped carbon films of K. Hou et al. have a hardness lower than 35 GPa.

When the hardness is below 35 GPa, the coatings are too soft and when used as coatings of BPPs in fuel cells, and in particular for longer lifetimes and severe operational conditions, such as high voltage during operation, weakly bonded, i.e. $sp^2$ bonded, carbon atoms are dissolved, leach out from the coating and diffuse out, with an associated undesirable increase of the ICR.

For instance, the hardness of the doped DLC according to the present invention can be in the range of 40 to 60 GPa. The hardness of the doped DLC according to the present invention is more preferably ≥45 GPa, which is even more beneficial for avoiding an increase of the ICR due to leached out $sp^2$ bonded carbon and catalyst pollution by out-diffusion.

The hardness of the doped DLC according to the present invention is indicated in this application as GPa. The hardness is measured by nano-indentation of a Vickers pyramid indenter on a film of the non-hydrogenated transition metal-doped DLC deposited on a flat polished hardened substrate with an indentation depth less than 10% of the film thickness. The flat polished hardened substrate has a surface roughness Ra of 0.01 μm and Rz of 0.25 μm. The hardness of the flat polished hardened substrate used was 83.6 HRa (Rockwell hardness A, HRA), 62.1 HRc (Rockwell hardness C, HRC) and 747 HV10 (Vickers hardness at a load of 10 kgf). Details of measuring the hardness can be found in the section "Detailed description of preferred embodiments" of this application.

The doped DLC according to the present invention has a much higher hardness than the BPP coatings known from the literature, such as from Z. Wang et al. and K. Hou et al., which is caused by a higher fraction of $sp^3$ bonds, which is typically above 60%. In non-hydrogenated DLCs, the hardness correlates with the $sp^3$ fraction, i.e. the fraction of carbon atoms present in the $sp^3$ bonded state in terms of the sum of carbon atoms in the material in the sp, $sp^2$ and $sp^3$ hybridization state, i.e. sp, $sp^2$ and $sp^3$-bonded carbon. The doped DLC according to the present invention typically has a $sp^3$ fraction of ≥60%, preferably ≥70%, more preferably ≥80% and most preferably ≥85%.

Owing to its high $sp^3$ fraction, the doped DLC according to the present invention can be denoted as ta-C, i.e. tetrahedral amorphous carbon. By virtue of the higher fraction of $sp^3$-bonded carbon, weakly bonded carbon will not be dissolved even for longer lifetimes such as more than 10,000 hours and harsh operation conditions, such as high voltage, such as encountered in fuel cells for trucks or trains, and in electrolyzers, when the doped DLC according to the present invention is used as a coating of BPPs.

Owing to its high hardness, and because it is non-hydrogenated DLC, the doped DLC according to the present invention is superior as a coating reducing friction and/or improving wear resistance of a surface, onto which it is applied.

Raman spectroscopy can be used to assess the $sp^3$ fraction of carbon atoms and the presence of carbides of the transition metal(s), namely, the presence of TM-C bonds in the doped DLC according to the present invention. For instance, when the TM is W, the presence of TM-C bonds can be detected in Raman spectra by a peak in the range of 80-150 $cm^{-1}$ for an excitation wavelength of 532 nm. Regarding the $sp^3$ fraction, from the position of the G peak in Raman spectroscopy for the excitation wavelength used, as well as the ratio of the intensity of the D peak ($I_D$) and the intensity of the G peak ($I_G$), i.e. $I_D/I_G$, the $sp^3$ fraction can be estimated. This is described by A. C. Ferrari in his above-mentioned scientific article and illustrated in FIG. 2 of that article. The Raman excitation wavelength used here was 532 nm. For samples of the doped DLC according to the present invention, the position of the G peak was typically at 1,605 $cm^{-1}$, which for that excitation wavelength points to a $sp^3$ fraction of carbon atoms over 60%.

In the present invention, the composition analysis of the doped DLC according to the present invention and the coatings of the material is preferably done by Electron Probe Micro Analysis (EPMA). Especially, the content of the at least one transition metal in the doped DLC according to the present invention can be determined by EPMA.

When the doped DLC according to the present invention is specified as "non-hydrogenated", this means that no hydrogen is deliberately added during the deposition, in particular no significant amounts of hydrogen are added during the deposition of the material. However, a bit of hydrogen coming from water vapor in the system may be present and be incorporated in the doped DLC according to the present invention. Therefore, due to such sources of hydrogen, the "non-hydrogenated" doped DLC according to the present invention may have a hydrogen content of <1 at. %, in particular coming from water vapor in the system, for instance when the material is deposited with high productivity, and short pumping and short heating times of the deposition chamber.

For the same reasons as described above for hydrogen, small amounts of oxygen coming from water vapor in the system and trace air, and small amounts of argon coming from trace air and the inert gas atmosphere in the system may be present and be incorporated in the doped DLC according to the present invention. Therefore, due to such sources of oxygen and argon, the non-hydrogenated doped DLC according to the present invention may have an oxygen content of <1 at. % and an argon content of <1 at. %, in particular coming from water vapor, trace air and the inert gas atmosphere in the system, for instance when the material is deposited with high productivity, and short pumping and short heating times of the deposition chamber. Preferably, the oxygen content is <0.5 at. % and the argon content is <0.5 at. %. Most preferably, the oxygen content is <0.1 at. % and the argon content is <0.1 at. %.

The doped DLC according to the present invention is doped with at least one transition metal. The transition metal is selected from the groups 4d, 5d and 6d of the periodic table of elements. Thus, the at least one transition metal is selected from the group consisting of titanium (Ti), zirconium (Zr), hafnium (Hf), vanadium (V), niobium (Nb), tantalum (Ta), chromium (Cr), molybdenum (Mo) and tungsten (W). Preferably, the at least one transition metal is selected from the group consisting of chromium, molybdenum and tungsten. Most preferably, it is tungsten. All of the above-mentioned transition metals for use in the invention can form carbides. Therefore, they can all be present in the form of carbide in the non-hydrogenated DLC as a matrix as required in the present invention.

The content of the at least one transition metal is not specifically limited, but is according to a preferred embodiment in the range of 0.1 to 5 at. % in terms of the non-hydrogenated transition metal-doped DLC. According to preferred embodiments, the content of the at least one transition metal in the doped DLC according to the present invention is 0.2 to 2.5 at. %, more preferably 0.3 to 2.0 at. % and most preferably 0.5 to 1.5 at or it is 1 to 5 at. %, more preferably 2 to 4 at. %.

When the doped DLC according to the present invention is for use as a coating on a bipolar plate in a fuel cell or an electrolyzer, the contents of the at least one transition metal (also referred to as dopant levels herein), in terms of the non-hydrogenated transition metal-doped DLC, i.e. in the coating or the concerned layer within the coating, which may be a multilayer coating, is favorably between 0.1 to 2.5 at. %, more preferably 0.3 to 2.0 at % and most preferably 0.5 to 1.5 at %.

The non-hydrogenated transition metal-doped DLC according to the present invention is preferably a homogenous material.

This is because in the cathodic arc discharge deposition method of the invention, which can yield the doped DLC according to the present invention, homogenous coatings can be deposited. This is due to the fact that a carbon target doped with the at least one transition metal is used in the present invention as a target in the cathodic arc discharge. The literature examples using CFUBMSIP (such as Z. Wang and K. Hou in their above-mentioned scientific articles) have used cathodes with pure C and a pure metal, where the cathodes are either opposite (for 2 cathode systems), or at 90 degree (for 4 cathode systems) in the deposition chamber. Due to the rotation of the substrate table the concentration of the transition metal will in these cases display a layer-wise modulation of the transition metal content in a size order of 2 to 30 nm, depending on the rotation speed, deposition rate and equipment lay-out. This is because when for instance a TM target and two graphite targets are used in the CFUBMSIP method (such as employed by Z. Wang and K. Hou in their above-mentioned scientific articles), the TM content of the coating will be higher when facing the TM target during the rotation, and it will be a bit lower when facing the graphite target. In coatings of the doped DLC according to the present invention, the above nano-scale layer-wise modulation of the transition metal content in the thickness direction of the coating, in particular in size order of 2 to 30 nm can be avoided. That means, the at least one transition metal can be distributed uniformly (also when present as carbide or as a metallic droplet) throughout the coating, in particular in the thickness direction of the coating, in the doped DLC according to the present invention.

In the present invention, the at least one transition metal in the form of carbide is present in, i.e. distributed, preferably uniformly, within the non-hydrogenated DLC as a matrix. The size of the TM carbide phases or domains is not specifically limited. The carbides may be present as atomically distributed W—C units on the lower end, and as islands, in particular those having a size in the nm range, i.e. "nano-sized islands", on the upper end. As used herein, the nanometer range, i.e. the nano-size is defined to include sizes from 0.1 nm to 100 nm. According to a preferred embodiment, the TM carbide is present atomically distributed up to nano-sized islands, more preferably up to nano-sized islands having a size of at most 2 nm. Still more preferably, the carbide of the at least one transition metal is present as nano-sized islands of the size of about 0.5 nm to 2 nm. This proved beneficial for fulfilling the demanding requirements as a BPP coating, in particular for ensuring that there is covalently bound transition metal in the doped DLC according to the present invention, resulting in the desirable low ICR. At the same time, the presence of at least a part of the carbide of the at least one transition metal as nano-sized islands having a size of at most 2 nm results in the desired high hardness. In other words, the presence of the carbide of the at least one transition metal as islands having a size of at most 2 nm in the non-hydrogenated DLC as a matrix allows to achieve a DLC coating which combines a low ICR and a high hardness. Normally, very hard ta-C coatings have a high ICR. This might be explained as follows. On the one hand, a higher fraction of $sp^3$-bonded carbon usually results in an improved hardness of a DLC coating. On the other hand, a higher $sp^3$ fraction usually results in reduced conductivity of the DLC coating and thus higher ICR. In the present invention, the size of the of the islands of the transition metal carbide can be determined by Transmission Electron Microscopy (TEM), in particular by bright field TEM (BFTEM) and high angle annular dark field with spot for scanning TEM (HAADF-STEM).

According to a preferred embodiment, another part, preferably the other part, of the at least one transition metal is present in the form of metal droplets. The droplets preferably have a diameter of less than 1 µm, preferably of 0.1 to 100 nm, preferably of 0.5 to 40 nm. Such small TM droplets that are distributed in the matrix of the doped DLC according to the present invention, and as such embedded in the coating of the material can form a particularly effective source of free transition metal, thus further contributing to the low ICR when the material is used as a coating on a BPP in a fuel cell or an electrolyzer.

To discriminate between the transition metal present in the form of carbide and the one present in the form of metal as droplets in the non-hydrogenated DLC as a matrix, Transmission Electron Microscopy (TEM) studies with bright field TEM (BFTEM) and with high angle annular dark field with spot for scanning TEM (HAADF-STEM) were carried out in the present invention. The combination of BFTEM and HAADF-STEM in conjunction with the Raman spectra allows the discrimination between the two forms of the transition metal present in the non-hydrogenated DLC matrix in the material according to the present invention. Moreover, the size of metal droplets could be determined by TEM, in particular by BFTEM and HAADF-STEM in the present invention.

Moreover, it will be shown for concrete embodiments below that W having a melting point of above 3,400° C. can form metallic droplets in the cathodic arc discharge deposition method according to the present invention that are present in the non-hydrogenated DLC matrix according to a preferred embodiment of the present invention. Thus, this will equally be possible for the other above-mentioned transition metals for use in the present invention having lower melting points.

According to a preferred embodiment, the part of the at least one transition metal present in the form of carbide in the doped DLC according to the present invention can be present in an amount of 60 at. % or less, in terms of the overall content of transition metal in the material, and is more preferably 50 at. % or less, still more preferably 40 at. % or less, further preferably 30 at. % or less, and most preferably 20 at. % or less. As found by the inventors, there is hardly any "free" transition metal (or segregated transition metal) in the doped DLC according to the present invention in the sense that it is neither in the form of carbide (such as in the form of carbide islands) nor in the form of metal droplets. That is, according to a preferred embodiment of the doped DLC according to the present invention, a total of ≥85 at. %, preferably ≥90 at. %, more preferably ≥95 at. % of the at least one transition metal, is present in the matrix of the non-hydrogenated DLC in the form of carbide (preferably as islands of the carbide) and/or in the form of metal droplets. Thus, the remainder of the at least one transition metal, i.e. the difference of the above-mentioned percentages of the amounts of transition metal present in the form of carbide to 100%, was found to be preferably present in the form of metal droplets of the transition metal. Therefore, in a preferred embodiment of the invention, the above-mentioned percentages of the transition metal in the form of carbide and the percentages of the transition metal in the of metal droplets will sum up to 100% of the transition metal present in the doped DLC according to the present invention.

Layer Systems

The doped DLC according to the present invention can form a layer system comprising at least one layer of it provided on a substrate. The substrate is preferably a metal substrate, in particular a stainless steel substrate or a titanium substrate, and especially particular an ultrathin sheet stainless steel having higher conductivity, better manufacturability and lower cost, compared to the traditional BPP graphite material. The thickness of the coating of the doped DLC according to the present invention and of the one or more layers of the doped DLC according to the present invention present in the layer system can be measured by SEM in the present invention.

Application as Coating of BPP in Fuel Cells and Electrolyzers

Owing to its outstanding combination of low ICR, high corrosion resistance and no emission of ions even under severe operating conditions, the doped DLC according to the present invention is useful as a coating on a BPP in a fuel cell or an electrolyzer. Accordingly, the present invention is also directed to a use of the doped DLC according to the present invention as a coating on a bipolar plate in a fuel cell or an electrolyzer. Moreover, the present invention relates to a proton exchange membrane fuel cell (PEMFC) or an electrolyzer comprising a metallic BPP having a coating of the doped DLC according to the present invention.

Further, the present invention pertains to a fuel cell comprising a proton-conducting polymer electrolyte membrane having a first surface and a second surface opposite to the first surface, and an anode formed on the first surface and a cathode formed on the second surface. On the side of the anode in that order from the first surface of the proton-conducting polymer electrolyte membrane, a gas diffusion layer, a metallic BPP, and a device for feeding hydrogen are provided. On the side of the cathode a gas diffusion layer, a metallic bipolar plate, a device for feeding an oxygen-containing gas and a device for removing water formed when the fuel cell is in operation are provided in that order from the second surface of the proton-conducting polymer electrolyte membrane. The anode and the cathode are electrically connected through their corresponding metallic BPP, i.e. the anode through the metallic BPP on the anode side, and the cathode through the metallic BPP on the cathode side. At least one of the BPPs, preferably both BPPs have a coating of the doped DLC according to the present invention.

Accordingly, the metallic BPPs comprising the coating each constitute a layer system as claimed, which comprises at least one layer of the doped DLC according to the present invention provided on a substrate. The substrate is preferably a steel substrate, a titanium substrate or an aluminium substrate, more preferably a stainless steel substrate or a Ti substrate. The thickness of the substrate, in particular the stainless steel or the Ti substrate may be as low as 0.05 to 0.1 mm. The substrate may be cleaned by ion bombardment, in order to remove native oxides from the surface of the substrate. Ion bombardment of the substrate prior to deposition of a further layer on top of the substrate promotes adhesion of the further layer on top of the substrate and reduces the ICR. For example, the substrate can be cleaned by Ar etching, i.e. argon ions bombardment. In the layer system, an adhesion layer can be provided directly on the substrate, on top which the at least one layer of the doped DLC according to the present invention can be formed. The adhesion layer can for instance be a layer of metallic Cr or metallic Ti. The layer system can also comprise a multilayer, with the multilayer comprising at least one layer of the doped DLC according to the present invention. Preferably, it is a multilayer of at least one layer of the non-hydrogenated transition metal-doped DLC, in which the content of the at least one transition metal is X at. % in terms of the layer, and at least one layer of the non-hydrogenated transition metal-doped DLC, in which the content of the at least one transition metal is more than 0 to 0.8 times X at. % in terms of the layer and/or at least one layer of ta-C. According to a preferred embodiment, there are thus at least two layers in the multilayer, one of which has a higher transition metal content, and one of which has a lower transition metal content (or no transition metal at all, which is the case for a layer of ta-C). There may be more than two alternating layers of high transition metal layer and low/no transition metal layer in the multilayer. The layer system can also comprise a transition layer between the adhesion layer and the single layer of the doped DLC according to the present or the multilayer of or comprising the doped DLC according to the present invention as described above, by a ramp down of the adhesion metal layer and ramp up of the doped DLC according to the present invention or the ta-C layer.

When the layer system according to the present invention, in particular the one for use as a BPP in fuel cells and electrolyzers, comprises a single layer of the doped DLC according to the present invention, the thickness of the layer is preferably in the range of 50 nm to 3 μm, preferably in the range of 80 nm to 1 μm. This also applies to each of the layers of the doped DLC according to the present invention when present as or in a multilayer. The multilayer preferably has a thickness in the range of 0.1 to 30 μm, more preferably of 0.2 μm to 10 μm. This excludes the thickness of the optional adhesion layer and the optional transition layer present on the substrate and of course the thickness of the substrate as such.

Deposition Method

Non-hydrogenated DLC having a hardness as high as ≥35 GPa, preferably of ≥40 GPa, as claimed in claim 1, which can be denoted as "ta-C" and typically has a sp$^3$ fraction of above 60% can only be created if there is a high plasma density, in other words a high degree of ionization. The doped DLC according to the present invention can therefore not be obtained with standard unbalanced magnetron sputtering methods such as employed by Z. Wang et al. and K. Hou et al. For standard unbalanced magnetron sputtering, unlike for High Power Impulse Magnetron Sputtering (HIPIMS), the degree of ionization is too low.

The invention further provides a method of depositing a coating of non-hydrogenated DLC comprising at least one transition metal selected from groups 4d, 5d and 6d of the periodic table of elements. The method is a cathodic arc discharge deposition method. In the cathodic arc discharge, a direct current (DC) is superimposed with a pulsed current. The pulsed current has a pulse frequency in the range of 10 kHz to 100 kHz. A carbon target doped with the at least one transition metal is used as a target in the cathodic arc discharge. The target is connected directly to a cathode. Each pulse of the pulsed current induces a rise of a voltage with a rate of more than 5 V/μs as measured on the cathode. Each pulse of the pulsed current has an active pulse width of less than 30 μs. In the method, the degree of ionization of the evaporated target material is close to 100%.

The dopant level of the target may be in the range of 0.5 at. % to 10.0 at. %, preferably in the range of 1.0 at. % to 8 at. %, more preferably in the range of 1.0 at. % to 6 at. % and more preferably in the range of 0.5 at. % to 2.5 at % of the at least one transition metal selected from groups 4d, 5d and 6d of the periodic table of elements. The at least one transition metal may be a transition metal as described above, such as tungsten (W). Using Electron Probe Microanalysis (EPMA), the present inventors found that about 60% of the transition metal being present in the target as dopant will be found in the doped DLC according to the present invention. For instance, 8 at. % W dopant in the target gave 5 at. % in the coating of the doped DLC according to the present invention, and 2 at. % W in the target gave 1.2 at. % in the coating.

Cathodic arc discharge deposition is a physical vapour deposition (PVD) technique in which an electric arc is generated between a target, which serves as a cathode or is connected to a cathode, and an anode. The electric arc evaporates material at a surface of the target in an area where the arc is present. The evaporated target material is deposited on a substrate so as to form a coating of the target material on the substrate. A. Anders, in the textbook "Cathodic ARCs", Springer, 2008, ISBN 978-0-387-79107-4 provides a detailed introduction into cathodic arc discharge deposition.

The difference between cathodic arc and standard unbalanced magnetron sputtering is that the ionization of atoms to be deposited is much higher in the arc discharge than in the unbalanced magnetron discharge. The ionization of carbon (C) in a DC arc has been described by A. Andersin "Cathodic ARCs", Springer (2008), ISBN 978-0-387-79107-4, paragraph 4.3 on pages 194-195, and is also for arc currents of 200 A already 100% singly ionized, and at higher currents even partially double ionized. The ionization of Carbon by Magnetron sputtering is much lower; typical values for C sputtering are in the range of 5%. ta-C with a higher fraction of sp$^3$ has been described by Lifschitz et al. (Physical Review B, Vol. 41, No. 15, pp. 10468-10480) to be due to a sub-plantation process. Carbon atoms are arriving with an energy, sufficiently high to penetrate the surface of the growing film to a depth of typically 3 atom layers. At this depth the implanted atoms experience a high pressure and due to the high pressure sp$^3$ bonds are formed. With standard (unbalanced) magnetron (non-HIPIMS) the average energy is too low due to the low ionization degree, to have sub-plantation for most C atoms.

In the present cathodic arc discharge deposition method, the cathodic arc discharge is generated or fed by supplying a direct current which is superimposed with a pulsed current. By employing such a superposition of currents, the generation of macro-particles of the target material, i.e., macro-particles of carbon doped with the at least one transition metal, in the cathodic arc discharge process can be significantly reduced. Further, the occurrence of relatively deep craters with sharp edges on the target surface can be minimised. In particular, the pulses superimposed on the direct current cause a splitting of the electric arc into a plurality of arcs, jumping out of the crater of the first arc and rounding the edges by evaporation in this process, thus avoiding the formation of craters, especially deep craters, with sharp edges. Such sharp edges can be released from the target as macro-particles of the target material, thus affecting the quality of the coating to be formed. In the present method, the pulses of the pulsed current have a high rise rate. Hence, the splitting into a plurality of arcs occurs within a particularly short period of time.

Therefore, a high quality coating can be achieved. Moreover, since the formation of such macro-particles can be suppressed, there is no need to use a macro-particle filter in the deposition method, thus allowing for the method to be significantly simplified.

The target is connected directly to the cathode, i.e., without any intermediate layers or structures being present between the target and the cathode.

The pulsed current has a pulse frequency in the range of 10 kHz to 100 kHz, preferably in the range of 20 kHz to 90 kHz, more preferably in the range of 30 kHz to 80 kHz and even more preferably in the range of 40 kHz to 70 kHz. By choosing a pulse frequency in the range of 10 kHz to 100 kHz, the formation of macro-particles of the target material can be particularly efficiently and reliably suppressed.

For production applications, the cathodic arc discharge deposition process may be performed in a deposition chamber, in particular, a vacuum chamber, which is equipped with a plurality of cathodes. For example, if there is a bank of cathodes that are depositing simultaneously, the arc pulses can be synchronized with a delay set between the different arc sources, such that only one pulse at a time occurs, avoiding overload of a bias voltage power-supply.

In "Production of highly ionized species in high-current pulsed cathodic arcs" (R. Sangines, A. M. Israel, I. S. Falconer, D. R. McKenzie, and M. M. M. Bilek, Applied Physics Letters 96, 221501 [2010]), it is shown, in FIG. 2, that in pulsed arc deposition of Al with fairly long pulses of 600 µs and with a peak current of 800 A, doubly ionized Al is formed, but reaches its maximum already after 40 µs. It decreases then rapidly, with singly ionized Al left. The arc has continuously split at approximately every incremental 60 A. The arcs have repelled each other. The fact that the double ionization has reduced considerably after 100 µs means that the plasma is similar to a DC arc after that period.

In order to remain in the regime where higher ionization occurs and has not recombined with neutrals going back to standard DC arc conditions, the present method uses a high pulse voltage rise rate, so that all arcs are still close to each other, and the active pulse width of each pulse of the pulsed current is kept relatively short. The maximum time where the arc voltage still increases is less than 30 µs.

Each of the pulses of the pulsed current which is superimposed on the direct current induces a rise of a voltage, i.e., an arc discharge voltage, measured at the cathode with a rate of more than 5 V/µs. The voltage may be measured between the cathode and the anode. The anode may be at ground potential.

Using pulses inducing such a high voltage rise rate at the cathode, to which the target is connected directly, enables the generation of a plasma with a particularly high plasma intensity, plasma density and plasma temperature. By generating such a high density plasma, droplets of molten transition metal are formed at a surface of the target. Further, the high density plasma ensures that larger-size transition metal droplets released from the target surface are broken up into smaller-size droplets during their transfer from the target to the substrate to be coated, so as to reduce the droplet size. Hence, the quality of the coating can be further improved. In particular, the incorporation of such smaller-size droplets in the coating can considerably enhance the electrical conductivity of the coating, which is particularly beneficial, e.g., for a coating on a bipolar plate in a fuel cell or an electrolyzer. Further, the droplets can improve the friction reducing properties of the coating. Since the droplet size is reduced by the high density plasma during transfer of the droplets from the target to the substrate, the incorporation of large-size droplets in the coating can be avoided, thus obtaining a coating with a smooth and even surface structure.

Preferably, the rise rate of the voltage measured at the cathode which is induced by the pulses is more than 8 V/µs, more preferably more than 10 V/µs, even more preferably more than 12 V/µs, yet even more preferably more than 14 V/µs and still even more preferably more than 16 V/µs.

Each of the pulses of the pulsed current which is superimposed on the direct current has an active pulse width of less than 30 µs. The active pulse width of a pulse is defined as the time in which the arc current induced by the pulse is not yet decaying. The arc current induced by the pulse is measured at the cathode. The arc current induced by the pulse may start decaying when a pulse power supply supplying the pulse is switched off. By cutting off the pulses after such a relatively short time of less than 30 µs, it can be reliably avoided that the arc splitting enters a regime where the distances between arcs are bigger and the plasma density decreases to approximately the DC arc plasma density.

The pulses of the pulsed current may have an active pulse width of 1 µs or more and less than 30 µs, preferably in the range of 2 µs to 20 µs and more preferably in the range of 4 µs to 10 µs. Particularly preferably, the pulses of the pulsed current may have an active pulse width of 5 µs.

The direct current may be in the range of 50 A to 1000 A, preferably in the range of 100 A to 800 A, more preferably in the range of 200 A to 600 A and even more preferably in the range of 250 A to 500 A. Choosing a direct current in the range of 50 A to 1000 A can further enhance the formation of droplets of molten transition metal at the target surface.

The peak current of the direct current superimposed with the pulsed current may be higher than 200 A. The direct current superimposed with the pulsed current is measured at the cathode. By selecting a peak current of more than 200 A, the droplet size can be reduced by the high-density plasma during transfer of the droplets from the target to the substrate in a particularly efficient manner.

The pulses of the pulsed current may have pulse separations in the range of 20 µs to 200 µs, preferably in the range of 40 µs to 150 µs and more preferably in the range of 60 µs to 120 µs. Particularly preferably, the pulses of the pulsed current may have a pulse separation of 80 µs.

The method of the invention may be performed at a deposition temperature in the range of 50° C. to 180° C., preferably in the range of 70° C. to 150° C. The deposition temperature is measured at the substrate to be coated. Particularly preferably, the deposition temperature is kept between 70° C. and 150° C. By controlling the deposition temperature so as not to exceed 150° C., it can be particularly reliably ensured that the Young's modulus and the hardness of the coating do not decrease significantly.

A bias may be applied to the substrate in the cathodic arc discharge deposition process. The bias may be in the range of 10 V to 100 V, preferably in the range of 20 V to 80 V and more preferably in the range of 40 V to 60 V. Particularly preferably, the bias may be 50 V.

The background pressure in the cathodic arc discharge deposition process may be in the range of $1\times10^{-5}$ mbar to $5\times10^{-4}$ mbar, preferably in the range of $2\times10^{-5}$ mbar to $1\times10^{-4}$ mbar and more preferably in the range of $4\times10^{-5}$ mbar to $6\times10^{-5}$ mbar. Particularly preferably, the background pressure in the cathodic arc discharge deposition process may be $5\times10^{-5}$ mbar.

The cathodic arc discharge deposition process may be performed in an atmosphere which contains an inert gas. More particularly, the cathodic arc discharge deposition process may be performed in an atmosphere which contains argon (Ar) or nitrogen ($N_2$). In particular, the cathodic arc discharge deposition process may be performed in a deposition chamber into which such a gas has been introduced. The background pressure of the inert gas, in particular, Ar, may be in the range of $1\times10^{-4}$ mbar to $9\times10^{-4}$ mbar, preferably in the range of $2\times10^{-4}$ mbar to $8\times10^{-4}$ mbar and more preferably in the range of $4\times10^{-4}$ mbar to $6\times10^{-4}$ mbar. Particularly preferably, the background pressure of the inert gas, in particular, Ar, may be $5\times10^{-4}$ mbar. By performing the cathodic arc discharge deposition process in such an atmosphere, the ignition of the electric arc can be facilitated.

Prior to depositing the coating, the substrate to be coated may be cleaned, e.g., by ion etching, using Ar or metal ions.

The coating may be deposited directly on a surface of the substrate, i.e., without any intermediate layers being present between this surface and the coating. Alternatively, an initial adhesion layer may be provided on the surface of the substrate to be coated before depositing the coating thereon. The initial adhesion layer may be, for example, a metallic chromium (Cr) layer or a metallic titanium (Ti) layer. There is no limitation as to the method of applying the initial adhesion layer, and for example any CVD or PVD method, including sputtering, can be used.

The deposition parameters, such as the characteristics of the direct current and the pulsed current, the deposition temperature, the substrate bias, the gas atmosphere and the pressure, may be kept at least substantially constant during the cathodic arc discharge deposition process.

In some embodiments, the pulsed current may have a pulse frequency in the range of 20 kHz to 90 kHz. The dopant level of the target may be in the range of 0.5 at. % to 10.0 at. %. Each pulse of the pulsed current may induce a rise of a voltage with a rate of more than 8 V/µs as measured on the cathode. Each pulse of the pulsed current may have an active pulse width in the range of 2 µs to 20 µs. The peak current may be higher than 200 A. The pulses of the pulsed current may have pulse separations in the range of 20 µs to 200 µs. The method may be performed at a deposition temperature in the range of 50° C. to 180° C. A bias in the range of 10 V to 100 V may be applied to the substrate in the cathodic arc discharge deposition process. The background pressure in the cathodic arc discharge deposition process may be in the range of $1\times10^{-5}$ mbar to $5\times10^{-4}$ mbar.

The coating deposited by the method of the present invention may be a coating of the doped DLC according to the present invention. The coating deposited by the method of the present invention may have the features, properties and characteristics described above.

It was found by the present inventors that the higher the content of transition metal, such as tungsten, in the target is, the more is relatively found in the coating of the doped DLC according to the present invention as metal droplets. This is well understandable as on the target surface, under the influence caused by the arc, large particles of molten transition metal segregate alongside the arc track. When the arc hits such a transition metal particle, then droplets are emitted and broken up into smaller-size droplets due to the high density plasma caused by the high voltage rise rate of more than 10 V/µs, while the metal droplets travel from the target to the substrate to be coated, so as to reduce the droplet size. The percentage of transition metal, such as W, that segregates on the target surface as metallic droplets is more than linearly proportional with the dopant level of the target. This way, the relative proportions of the transition metal present in the form of carbide and the one present as a metal droplet in the doped DLC according to the present invention can be adjusted. FIG. 11 shows an example of a target exposed to the arc with 8 at. % of W. Small graters can be seen on the target surface. The white droplets are W.

The invention further provides a coating of the non-hydrogenated transition metal-doped DLC which is obtainable by the method of the present invention.

EMBODIMENTS

In the following, specific embodiments of the present invention will be summarized.

(1) A non-hydrogenated transition metal-doped diamond-like carbon (DLC), wherein the non-hydrogenated metal-doped DLC comprises at least one transition metal selected from groups 4d, 5d and 6d of the periodic table of elements and a part of the at least one transition metal is present in the form of carbide of the at least one transition metal in the non-hydrogenated DLC as a matrix, and wherein the non-hydrogenated transition metal-doped DLC has a hardness of ≥35 GPa, preferably of ≥40 GPa. The hardness can be measured on a film of the non-hydrogenated transition metal-doped DLC deposited on a polished substrate with an indentation depth less than 10% of the thickness of the film.

(2) The non-hydrogenated transition metal-doped DLC according to item (1), wherein at least a part of the carbide of the at least one transition metal is present as islands in the non-hydrogenated DLC as a matrix.

(3) The non-hydrogenated transition metal-doped DLC according to item (2), wherein the islands have a size of at most 2 nm.

(4) The non-hydrogenated transition metal-doped DLC according to any one of items (1) to (3), wherein the non-hydrogenated DLC is tetrahedral amorphous carbon, i.e. ta-C.

(5) The non-hydrogenated transition metal-doped DLC according to any one of items (1) to (4), wherein another part of the at least one transition metal is present in the form of the metal as droplets of the transition metal.

(6) The non-hydrogenated transition metal-doped DLC according to item (5), wherein the droplets of the transition metal have a diameter of less than 1 µm, preferably of 0.1 to 100 nm, preferably of 0.5 to 40 nm.

(7) The non-hydrogenated transition metal-doped DLC according to item (5) or (6), wherein a total of at least 85 at. %, preferably at least 90 at. %, of the at least one transition metal, is present in the matrix of the non-hydrogenated DLC in the form of carbide, preferably as islands of the carbide, and/or in the form of metal droplets.

(8) The non-hydrogenated transition metal-doped DLC according to any one of items (1) to (7), which has a $sp^3$ fraction of carbon atoms of ≥60%, preferably of ≥70%, more preferably of ≥80%, and most preferably of ≥85%.

(9) The non-hydrogenated transition metal-doped DLC according to any one of items (1) to (8), wherein the transition metal is selected from the group consisting of chromium, molybdenum and tungsten, and is preferably tungsten.

(10) The non-hydrogenated transition metal-doped DLC according to any one of items (1) to (9), wherein the content of the at least one transition metal is in the range of 0.1 to 5 at. % in terms of the non-hydrogenated transition metal-doped DLC, preferably in the range of 0.2 to 2.5 at. %, more preferably in the range of 0.3 to 2.0 at. %, most preferably in the range of 0.5 to 1.5 at. %.

(11) The non-hydrogenated transition metal-doped DLC according to any one of items (1) to (10), the hardness of which is in the range of 40 GPa to 60 GPa.

(12) A layer system comprising at least one layer of the non-hydrogenated transition metal-doped DLC according to any one of items (1) to (11) provided on a substrate.

(13) The layer system according to item (12), wherein the layer is a homogeneous layer.

(14) The layer system according to item (12) or (13), wherein the layer has a thickness in the range of 50 nm and 3 μm.

(15) The layer system according to any one of items (12) to (14), which comprises a multilayer of
at least one layer of the non-hydrogenated transition metal-doped DLC, in which the content of the at least one transition metal is X at. % in terms of the layer, and
at least one layer of the non-hydrogenated transition metal-doped DLC, in which the content of the at least one transition metal is more than 0 to 0.8 times X at. % in terms of the layer and/or at least one layer of ta-C.

(16) The layer system according to item (15), wherein the multilayer has a thickness in the range of 0.1 μm to 30 μm, preferably in the range of 0.2 μm to 10 μm.

(17) The layer system according to any one of items (12) to (16), wherein an adhesion layer is provided directly on the substrate, on top of which at least one layer of the non-hydrogenated transition metal-doped DLC is formed.

(18) The layer system according to any one of items (12) to (17), wherein the substrate is a metal substrate,

(19) The layer system according to any one of items (12) to (18), wherein the metal substrate is a stainless steel substrate, a titanium substrate or an aluminium substrate.

(20) The layer system according to item (19), wherein the metal substrate is a stainless steel substrate.

(21) The layer system according to item (19), wherein the metal substrate is a titanium substrate.

(22) A use of the non-hydrogenated transition metal-doped DLC according to any one of items (1) to (11) as a coating on a bipolar plate in a fuel cell or an electrolyzer.

(23) The use according to item (22), wherein the non-hydrogenated transition metal-doped DLC has a content of the at least one transition metal in the range of 0.3 at. % to 2.5 at. %.

(24) The use according to item (22) or (23), wherein the coating has a thickness in the range of 50 nm to 3 μm, preferably of 0.1 μm to 1 μm.

(25) A proton exchange membrane fuel cell or an electrolyzer comprising a metallic bipolar plate which has a coating of the non-hydrogenated transition metal-doped DLC according to any one of items (1) to (11).

(26) A fuel cell comprising
a proton-conducting polymer electrolyte membrane having a first surface and a second surface opposite to the first surface,
an anode formed on the first surface and a cathode formed on the second surface,
provided on the side of the anode in that order from the first surface, a gas diffusion layer, a metallic bipolar plate, and a device for feeding hydrogen, and
provided on the side of the cathode in that order from the second surface, a gas diffusion layer, a metallic bipolar plate, a device for feeding an oxygen-containing gas and a device for removing water formed when the fuel cell is in operation,
the anode and the cathode being electrically connected through their corresponding metallic bipolar plate,
wherein at least one of the bipolar plates has a coating of the non-hydrogenated transition metal-doped DLC according to any one of items (1) to (11).

(27) The fuel cell or electrolyzer according to item (25) or (26), wherein coating of the non-hydrogenated transition metal-doped DLC has a thickness in the range of 50 nm to 3 μm, preferably of 0.1 μm to 1 μm.

(28) A method of depositing a coating of non-hydrogenated DLC comprising at least one transition metal selected from groups 4d, 5d and 6d of the periodic table of elements, wherein the method is a cathodic arc discharge deposition method, wherein in the cathodic arc discharge, a direct current is superimposed with a pulsed current, wherein the pulsed current has a pulse frequency in the range of 10 kHz to 100 kHz, wherein a carbon target doped with the at least one transition metal is used as a target in the cathodic arc discharge, which target is connected directly to a cathode, wherein each pulse of the pulsed current induces a rise of a voltage with a rate of more than 5 V/μs as measured on the cathode, and wherein each pulse of the pulsed current has an active pulse width of less than 30 μs.

(29) The method according to item (28), wherein the peak current is higher than 200 A.

(30) The method according to item (28) or (29), wherein the coating is a coating of the non-hydrogenated transition metal-doped DLC as defined in any one of items (1) to (11).

(31) The coating of the non-hydrogenated transition metal-doped DLC as defined in any one of items (1) to (11), which is obtainable by a method as defined in item (28) or (29).

DETAILED DESCRIPTION OF PREFERRED EMBODIMENTS

Fuel Cell

In the following, a typical structure of a fuel cell, in which the doped DLC according to the present invention can be used as a coating will be illustrated in reference to FIG. 1.

Figure 1:
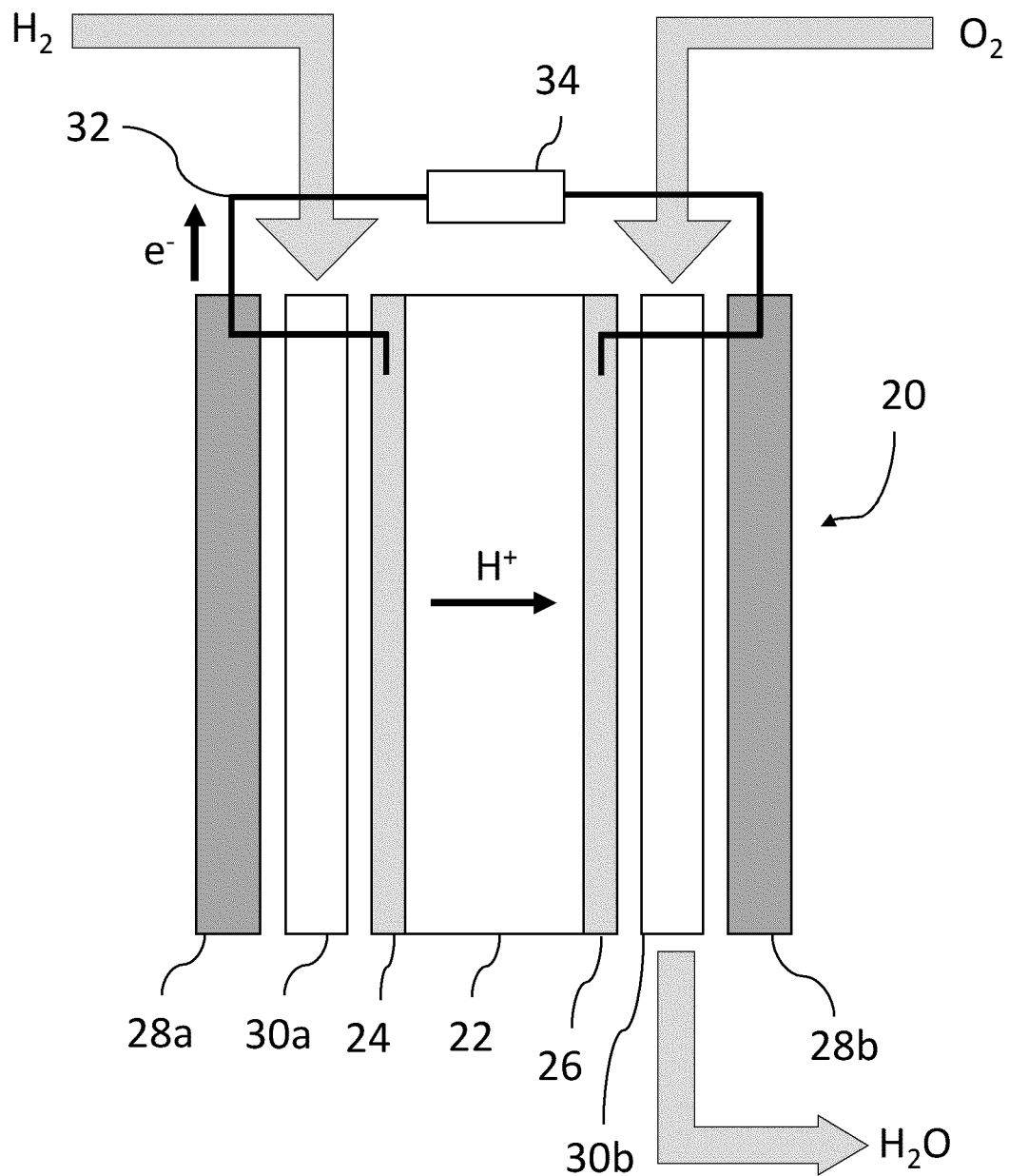
FIG. 1 is a cross-sectional schematic view showing the structure of a proton exchange membrane fuel cell (PEMFC) including bipolar plates (BPPs) coated with the doped DLC according to an embodiment of the present invention.

The fuel cell 20 shown in FIG. 1 provides a schematic drawing of a fuel cell, in particular PEMFC, or individual fuel cell within a fuel cell stack, in particular PEMFC stack. The fuel cell illustrated in FIG. 1 comprises a proton-conducting polymer electrolyte membrane (PEM) 22. The membrane 22 can also be referred to as a proton exchange membrane (PEM). As shown by the arrow, the PEM membrane 22 can conduct protons ($H^+$) from the anode 24 to the cathode 26. Normally, the anode and the cathode provided as coatings on the first and the second surface of the PEM, respectively, which coatings comprise electrocatalysts. The fuel cell shown in FIG. 1 further comprises gas diffusion layers 30, namely, a GDL on the side of the anode 30a, and a GDL on the side of the cathode 30b. Moreover, the fuel cell comprises bipolar plates 28, which are preferably metallic, in particular of stainless steel, titanium or aluminium, and especially of stainless steel or Ti. There is a BPP on the side of the anode 28a, and one on the side of the cathode 28b. As fuel gases, hydrogen ($H_2$) and oxygen ($O_2$) (preferably supplied in the form of air) are used, as is shown by the corresponding arrows in the figure. The fuel gases are let in the space where the GDL is, helped by the BPPs having a profile with valleys top to bottom, allowing the gases to reach the whole area where the GLD is mounted. In the BPP on the cathode side 28b, the channels also allow water (normally in the form of water vapor) formed when the fuel cell is in operation to be removed. As shown in FIG. 1, the anode 24 and the cathode 26 are electrically connected via their corresponding metallic BPP through a wire 32. As shown in FIG. 1, an electrical current ($e^-$) will flow via wire 32 from anode 24 through its corresponding BPP 28a through the BPP on the cathode side 28b to the cathode 26. In the wire 32, a consumer 34 is provided.

According to the present invention, at least one of the metallic BPPs 28a, 28b has a coating of the doped DLC according to the present invention (not shown).

A fuel cell as illustrated in FIG. 1 generates the electrical current ($e^-$) by electrochemical reactions as follows. Firstly, hydrogen is oxidized in the anode 24 by the catalytic material to generate protons and electrons. The generated protons ($H^+$) pass through the PEM 22 and reach the cathode 26. The electrons ($e^-$) generated together with the protons ($H^+$) pass through the electrically conductive carrier in the anode 24, the GDL 30a, the BPP 28a, and the external wire 32 and reach the cathode 26. In the cathode 26, catalyzed by the electrocatalysts, the protons and electrons react with oxygen ($O_2$) contained in the oxidant gas to produce water ($H_2O$).

Deposition Method

In the following, a method of depositing a coating of non-hydrogenated DLC comprising at least one transition metal selected from groups 4d, 5d and 6d of the periodic table of elements according to an embodiment of the present invention will be described with reference to FIG. 2.

Figure 2:
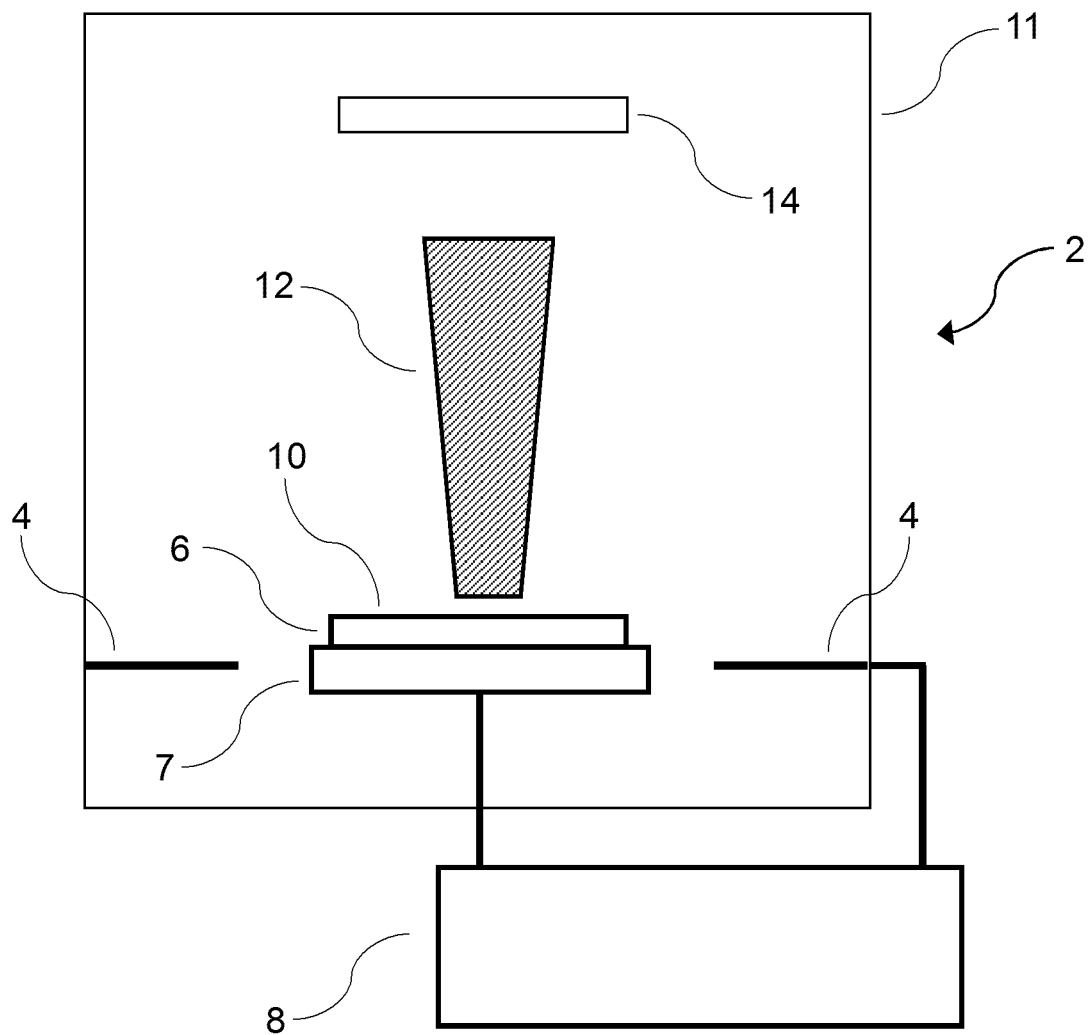
FIG. 2 is a cross-sectional view showing a cathodic arc discharge deposition apparatus for performing a deposition method according to an embodiment of the present invention.
Figure 3:
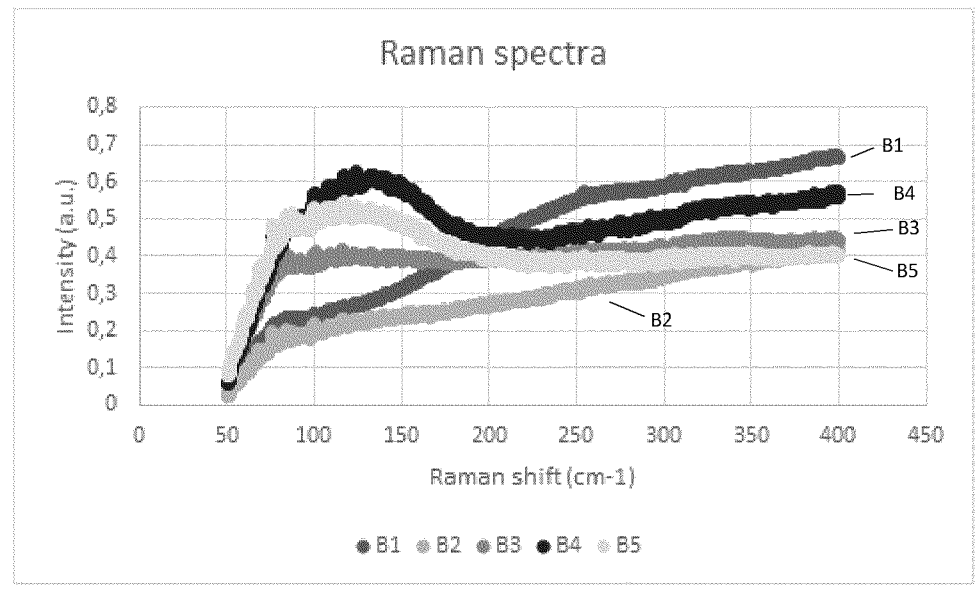
FIG. 3 shows Raman spectra of specific examples of coatings of the doped DLC according to the present invention. The samples had different dopant levels, i.e. contents of transition metal, namely, W, as follows: B1: 0 at. % (for reference); B2: 0.3 at. %; B3: 0.6 at. %; B4: 1.4 at. %; B5: 1.4 at. %. The Raman excitation wavelength was 532 nm with a 50 cm$^{-1}$ edge filter.

In the present embodiment, the method is performed using a cathodic arc discharge deposition apparatus 2 as shown in FIG. 2. The apparatus 2 comprises a deposition chamber 11, an anode 4, a target 6, a cathode 7, and a current source 8 electrically connected with the anode 4 and the cathode 7. The cathode 7 may be made of a metal, such as copper (Cu). For example, the cathode 7 may be a metal plate, e.g., a Cu plate. The cathode 7 may be cooled, for example, water-cooled. The anode 4 is integral with a wall of the deposition chamber 11. The anode 4 may form part of the wall of the deposition chamber 11. The anode 4 may be made of the same material as the wall of the deposition chamber 11, e.g., a metal, such as steel. The anode 4 has a substantially annular shape which is shown in cross-section in FIG. 2. For example, the anode 4 may be a substantially annular metal plate, e.g., a substantially annular steel plate. In particular, the anode 4 may be a substantially annular flat plate, such as a substantially annular flat metal plate. The anode 4 and the cathode 7 are arranged in a plane which is substantially perpendicular to a direction from the cathode 7 towards the target 6 (see FIG. 2). The cathode 7 is arranged within a central opening of the substantially annular anode 4.

The target 6 is connected directly to the cathode 7, i.e., without any intermediate layers or structures being present between the target 6 and the cathode 7. In particular, a surface, e.g., a backside surface, of the target 6 may be in contact, e.g., full contact, with the cathode 7, e.g., the body of the cathode 7. The target 6 may be mounted onto the cathode 7, for example, by a bolt connection (not shown). The target 6 is electrically connected directly to the cathode 7, e.g., by a direct contact between the backside surface of the target 6 and the cathode body.

The current source 8 is configured to supply a direct current which is superimposed with a pulsed current, so as to generate an electric arc between the target 6 and the anode 4. The electric arc evaporates material at a surface 10 of the target 6 in an area where the arc is present. The evaporated target material 12 (see FIG. 2) is transferred from the target 6 to a substrate 14 and deposited on the substrate 14 so as to form a coating of the target material thereon.

The anode 4, the target 6, the cathode 7 and the substrate 14 are arranged within a space formed inside the deposition chamber 11. The deposition chamber 11 may be a vacuum chamber, e.g., an ultrahigh vacuum (UHV) chamber. The anode 4 is integral with and connected, i.e., electrically connected, with the wall of the deposition chamber 11. The current source 8 is electrically connected with the anode 4 via the wall of the deposition chamber 11 (see FIG. 2). In particular, the wall of the deposition chamber 11 may be made of a conductive material, such as a metal, thus establishing an electrical connection between current source 8 and anode 4. In other embodiments, a plurality of cathodes 7 may be arranged in the deposition chamber 11.

The background pressure in the deposition chamber 11 may be $5 \times 10^{-5}$ mbar. The cathodic arc discharge deposition process of the present embodiment may be performed in an atmosphere in the deposition chamber 11 which contains an inert gas, in particular, Ar. For example, the pressure of Ar in the deposition chamber 11 may be $5 \times 10^{-4}$ mbar.

In the present embodiment, the target 6 is a carbon target doped with tungsten (W). Hence, a coating of non-hydrogenated DLC comprising W is formed on the substrate 14 by the deposition process. The dopant level of the target 6 is in the range of 0.5 at % to 8.0 at % W.

The superimposed currents supplied by the current source 8 have the following properties. A direct current of 50 A is superimposed with a pulsed current having a pulse frequency in the range of 10 kHz to 100 kHz. The pulses of the pulsed current have an active pulse width of 5 µs and a pulse separation of 80 µs. The peak current of the direct current superimposed with the pulsed current is higher than 200 A. The direct current and the pulsed current are measured at the cathode 7.

Each of the pulses of the pulsed current induces a rise of a voltage, i.e., an arc discharge voltage, measured at the cathode 7 with a rate of more than 5 V/µs. The voltage is measured between the cathode 7 and the anode 4. The anode 4 is at ground potential.

By employing such a superposition of currents, the generation of macro-particles of the target material in the cathodic arc discharge process can be significantly reduced. Further, the occurrence of craters on the target surface can be minimised. Moreover, it can be ensured that small-size droplets of molten W are incorporated in the coating, thus enhancing the electrical conductivity and the friction reducing properties of the coating. Hence, a particularly high quality coating can be provided on the substrate 14.

The pulses superimposed on the direct current cause a splitting of the electric arc into a plurality of arcs, as has been detailed above. In the present embodiment, the current, i.e., the arc current, of each single arc obtained by this splitting may be, for example, approximately 60 A. At the peak current, the total number of arcs may be, e.g., five or six. If the arc current is maintained at a high level, the arcs obtained by the pulse-induced arc splitting repel each other and the plasma characteristics become similar to those of a DC arc. Therefore, the active pulse width is kept short, i.e., below 30 µs. In the present embodiment, the active pulse width is 5 µs, as has been detailed above.

In the present embodiment, the cathodic arc discharge deposition process is performed at a deposition temperature in the range of 70° C. to 150° C. The deposition temperature is measured at the substrate 14. Further, a bias of 50 V is applied to the substrate 14.

The deposition parameters, such as the characteristics of the direct current and the pulsed current, the deposition temperature, the substrate bias, the gas atmosphere and the pressure, are kept substantially constant during the cathodic arc discharge deposition process of the present embodiment.

Prior to depositing the coating, the substrate 14 may be cleaned, e.g., by Ar etching. The coating may be deposited directly on a surface of the substrate 14. Alternatively, an initial adhesion layer may be provided on the surface of the substrate 14 before depositing the coating thereon. The initial adhesion layer may be, for example, a metallic chromium (Cr) layer or a metallic titanium (Ti) layer. From initial adhesion layer to doped Carbon layer, one could have an abrupt transition or a ramp down of the metal deposition rate and a ramp up of the doped Carbon deposition rate.

EXAMPLES

The present invention will be further illustrated by way of examples, which of course must not be construed in a limiting sense.

The coatings are deposited by running a cathodic arc discharge on a carbon target doped with W. The arc discharge was a DC arc with a pulse superimposed. Samples were prepared with a DC arc current of 50 A, superimposed with a pulse with a width of 5 µs, with pulse separation of 80 µs, and an arc peak current higher than 200 A. Dopant levels of W in between 0.5 and 5 at. % W have been applied. The deposition temperature is kept in between 70° C. and 150° C. The bias energy voltage applied to the substrate was 50 V. The background pressure was typically $5 \times 10^{-5}$ mbar. To have proper arc ignition a small quantity of Ar is allowed in the chamber, coming typically to an Ar pressure of $5 \times 10^{-4}$ mbar.

The products, i.e. substrates, to be coated are cleaned by Ar etching, i.e. argon ions bombardment, prior to the deposition. Addition of an initial adhesion layer like metallic Cr or metallic Ti has been applied for a number of samples, but also coatings without the adhesion layer have been produced.

The ta-C coatings were deposited without changing any of the parameters during the deposition step. That means that the conditions, like pressure, gas atmosphere, bias Voltage and substrate temperature were kept constant during the deposition process.

Analysis

Composition Analysis

The composition analysis of the coatings has been done by Electron Probe Micro Analysis EPMA with an acceleration Voltage of 5 keV, a current of 200 nA, and 10 test probes per sample. The compositions studied in detail are shown in Table 1.

TABLE 1

Overview of coatings studied

| Sample number | Composition | Indentation hardness $H_{IT}$ in GPa | Raman WC peak |
|---|---|---|---|
| B1 | ta—C | 54 | none |
| B2 | ta—C + 0.3 at % W | 52.4 | none |
| B3 | ta—C + 0.6 at % W | 43.4 | slightly |
| B4, B5 | ta—C + 1.4 at % W | 47.0 | clearly visible |

Hardness

The hardness is an indentation hardness $H_{IT}$ and has been measured by nano-indentation on a flat polished hardened substrate with a micro hardness tester (Fischerscope H100) according to ISO 14577 (namely, the English versions of ISO 14577-1:2015 of 15 Jul. 2015, ISO 14577-2:2015 of 15 Jul. 2015, and ISO 14577-4:2016 of Nov. 1, 2016) using a diamond indenter. The diamond indenter used has a Vickers geometry. That is, the indenter is a diamond with a square based pyramid shape with planes at 22° relative to the horizontal plane or in other words it is shaped as an orthogonal pyramid with a square base and with an angle of 68° between the axis of the diamond pyramid and one of the faces (Vickers pyramid). The hardness is expressed in GPa. The roughness Ra of the substrate was less than 0.06 μm. Specifically, the substrate (test plate) had a surface roughness Ra of 0.01 μm and Rz of 0.25 μm. The hardness of the flat polished hardened substrate used was 83.6 HRa (Rockwell hardness A, HRA), 62.1 HRc (Rockwell hardness C, HRC) and 747 HV10 (Vickers hardness at a load of 10 kgf). The size of the test plate, i.e. the flat polished hardened substrate, was 15×6 mm. The load of the indenter and the film thickness of the coating deposited on the test plate were selected such, that the indentation depth was less than 10% of the coating thickness. Ten points per sample (uniformly distributed over the surface of the coating to be measured) were taken for the measurement and the average of the ten hardness indentation values $H_{IT}$ thus measured is used (unit is GPa). The relation between indentation hardness $H_{IT}$ in GPa and Vickers hardness (Hv) is:

$$Hv = 94.53\ H_{IT}.$$

Raman Test

Raman tests were done on samples before and after the corrosion steps and with different dopant contents. The Raman excitation wavelength was 532 nm. The position of the G peak was at 1605 cm$^{-1}$, which for that excitation wavelength points to a sp$^3$ fraction over 60%. In between 80-150 cm$^{-1}$ there is a peak becoming visible, representing WC bonds. The pure ta-C sample and the one with 0.3 at % W does not show this peak. For 0.6 at % W and 1.4 at % W it is visible and is stronger for higher W content. Raman does not provide information whether the WC bonds are pointing to WC crystallites, or to bonds between individual W atoms with C. In tests of the coatings after a corrosion step, no substantial difference in Raman spectra pre- and post-oxidation could be seen.

TEM Studies of Samples

TEM studies were done with a beam Voltage of 200 kV with bright field TEM (BFTEM) and with high angle annular dark field with spot for scanning TEM (HAADF-STEM). The samples consisted of silicon (Si) wafers with a 20 nm thick Si$_3$N$_4$ layer on top, where at 1×1 mm$^2$ the Si was etched away. In this way windows are present. On top of the Si$_3$N$_4$ foil 80 nm ta-C was deposited doped with respectively 0.3, 0.6 and 1.4 at % W. The Si$_3$N$_4$ foil was mostly broken under influence of the compressive stress of the doped ta-C film, but we could find undisturbed foil in the corners of the windows. The observation was made from the side of the coating of the doped DLC according to the present invention deposited on the Si$_3$N$_4$ foil.

The combination of BFTEM and HAADF-STEM imaging allowed for discrimination between W droplets and carbon clusters.

Figure 4:
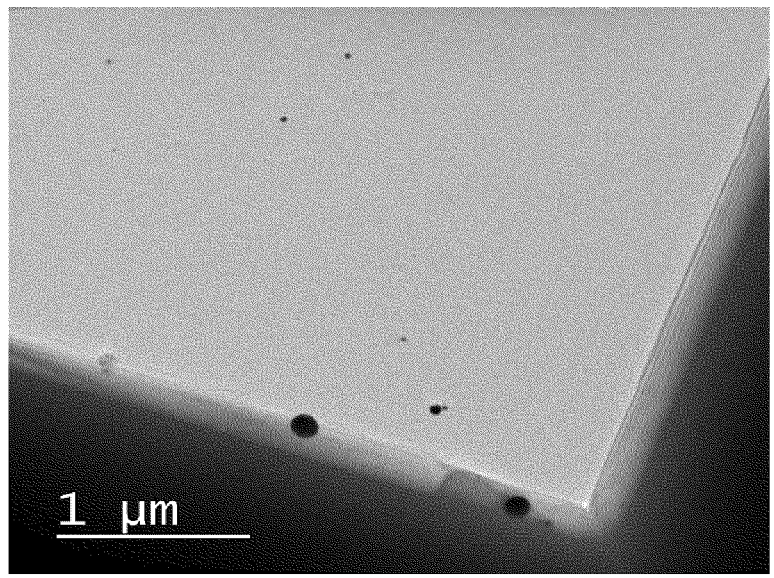
FIG. 4 is a Scanning Electron Microscope (SEM) image of 80 nm W doped ta-C with a W concentration of 1.4 at. % according to a concrete example of the doped DLC according to the present invention. Visible is the wafer window with $Si_3N_4$ film, on top of which the doped ta-C is deposited. The dark balls are W.

W droplets were identified in the 80 nm film. FIG. 4 shows a coating doped with 1.4 at % W observed with BFTEM. The small black spots are W droplets as confirmed by EDX analysis. In FIG. 4 the W droplet size ranges from 2 to 40 nm. In other samples droplets up to 100 nm were observed.

Figure 5:
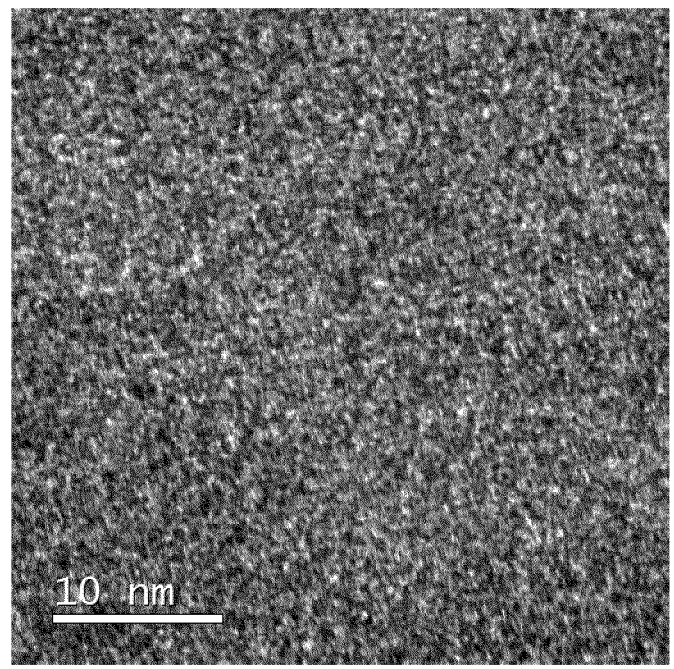
FIG. 5 is a high resolution transmission electron microscope (HR TEM) picture in HAADF-STEM mode of ta-C doped with 1.4 at. % W according to an example of the doped DLC according to the present invention. Due to focusing, only a slab of 20 nm is observed as a projection.

In FIG. 5 a HAADF-STEM image of the same sample doped with 1.4 at. % W is shown. Sub-nm clusters of W were recognizable (in HAADF-STEM W shows up as white). It should be realized that due to the focus of the HRTEM not the total film thickness of 80 nm, but only a slot with a thickness of approximately 20 nm was observed. Although an accurate measurement of such particles in a thick coating is not possible, a rough measurement yielded a cluster size of ~0.5 nm. W has a bcc structure with lattice spacing 0.34 nm. WC has normally a hexagonal distribution with lattice parameters 0.29 and 0.28 nm. So, the clusters are made up of a pretty limited number of W atoms, in the range of up to 10.

A semi-quantitative analysis was made of the amount of W visible in metallic droplets and the amount visible in WC islands, assuming that islands and droplets are spherical. For a coating of the doped DLC according to the present invention doped with 0.6 at % W, it was found that 50% of W could be attributed to WC islands and 50% of W in metallic droplets. For a film doped with 1.4 at % W approximately 30% of W could be attributed to WC islands and 70% to metallic W droplets. It is in line with the expectation that the amount of droplets increases more than linearly with the percentage of W in the target.

With the very clear presence of WC in the Raman spectra also for only 1.4 at % W, it is clear that the smaller crystallites are WC. The quantitative analysis did indicate that there is hardly any "free" W.

The excellent properties of the above materials as coatings for BPPs (metallic BPPs of stainless steel) in PEMFCs and Electrolyzers were confirmed by testing for their ICR and corrosion performance.

Interface Contact Resistance (ICR)

Within a PEM Fuel Cell or PEM Electrolyzer there are two crucial contact points where electron flow is inhibited, namely the catalyst-Gas Diffusion Layer (GDL) and GDL-BPP contact points. In a FC stack a BPP is placed between two GDLs so the electrical resistance of the contact point of the BPP is expressed as $R_{GDL\text{-}BPP\text{-}GDL}$. The GDLs also have an electrical resistance which is expressed as $R_{GDL}$. A typical GDL has two different resistances. The first one is a "through plane" resistance which is the electrical resistance perpendicular on a cm$^2$ area through a layer of GDL. The second one is an "in plane" resistance which is the electrical resistance per cm inside a layer of GDL. $R_{GDL\ (in\ plane)}$ is not used for the purpose of ICR measurements on the BPPs because electrons are transported perpendicular through the GDL layers, not parallel through them. The final electrical resistance of the contact point between GDL and catalyst is expressed as $R_{Cat.\text{-}GDL}$. The BPPs also have an electrical resistance, however this can be neglected, as the electrical resistance of these BPPs is 10,000 times lower than that of $R_{GDL\ (through\ plane)}$. First, $R_{Cat.\text{-}GDL}$ is measured of one GDL, then $R_{GDL\text{-}PP\text{-}GDL}$ and the desired result is the ICR from only the sample, therefore ICR is calculated using equation 1:

$$ICR = \frac{(R_{GDL-BPP-GDL} - R_{Cat.-GDL}) - R_{GDL(through\ plane)}}{2} \quad (1)$$

The instrumentation is composed of two gold-plated, cylindrical electrodes placed above each other. Gold thickness of each electrode is 100 nm. The top cylinder can be lowered with compressed air to achieve the necessary pressure on the BPP sample. GDL material is Toray carbon paper (TGP-H-60, 19×19 cm) from Alfa Aesar and cut into 1 square inch (6.45 cm$^2$) pieces to be placed under and on samples. Current is set, and potential is measured from which the electrical resistance is calculated to be used in the ICR equation. Reported measurements have been done at 1 MPa, to represent operational conditions in a PEM Fuel Cell or PEM Electrolzyer. As acceptable for the Interface Contact Resistance is considered <10 mΩ·cm².

Figure 6:
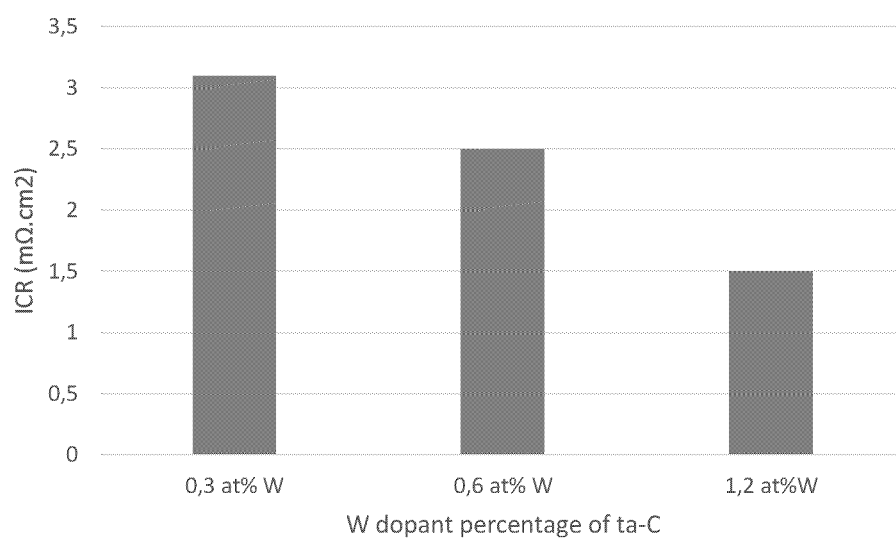
FIG. 6 shows ICR test results for ta-C having differing W dopant percentages according to a specific example of the present invention.

The measured ICRs of as deposited samples on stainless steel is shown in FIG. 6. There is a clear effect that modest W doping reduces the ICR to quite attractive values.

Accelerated Corrosion Testing

Typically, the test sample is subjected to oxidation in an electrolyte. The test sample functions as the anode of the electrochemical cell and is therefore called the "working" electrode. A "counter" electrode functions as the cathode to supply one end of the current, the other being working electrode. Anode and Cathode have an electrode potential ($E_{cathode}$ and $E_{anode}$) at its surface dependent on the reactions of the material with the electrolyte. The cell potential ($E_{cell}$), is given in equation 2.

$$E_{cell}=E_{cathode}-E_{anode} \qquad (2)$$

$E_{cell}$ can be obtained, but the individual electrode potentials cannot be measured directly. Across the electrolyte from counter to working electrode there is an electrical resistance where potential gradually drops the longer the distance is between the electrodes. This is undesirable when a current must flow for electrochemical reactions to take place. Therefore, electrode potential of the working electrode must be compared to a different electrode other than the counter electrode. A "reference electrode", which has a fixed potential of a known electrochemical system regardless of the current that might pass through it, is placed in the electrolyte. The working electrode potential can now be varied in respect to the known reference electrode potential. There will also be a potential drop between these electrodes, but if the reference electrode is placed as closely as possible near the working electrode, the potential drop is limited.

Measurements were performed with the electrolyte at 80° C. The electrolyte used was $H_2SO_4$ in water, with an acidity of pH 3 (16.3 mmol/l) with additionally 20 ppm Cl and 10 ppm F.

A potentio-dynamic test was done with a potential range from −0.7 to +0.7 V with the potential change of 0.1 mV/s and a current range of 10 mA. The scan rate was 1 scan/s, which was kept the same throughout all successive potentiodynamic tests for all samples.

A potentio-static test is performed after the potentiodynamic test at 0.6 V vs Ag—AgCl for 24 hours to simulate the corrosion during the fuel cell operation, followed by another potentiodynamic scan to determine the electrochemical characteristics of the corroded sample and compare them with the as-deposited sample. For every new sample, fresh electrolyte has been used. The cathodic corrosion current is expected to be smaller than 0.1μ/cm².

Figure 7:
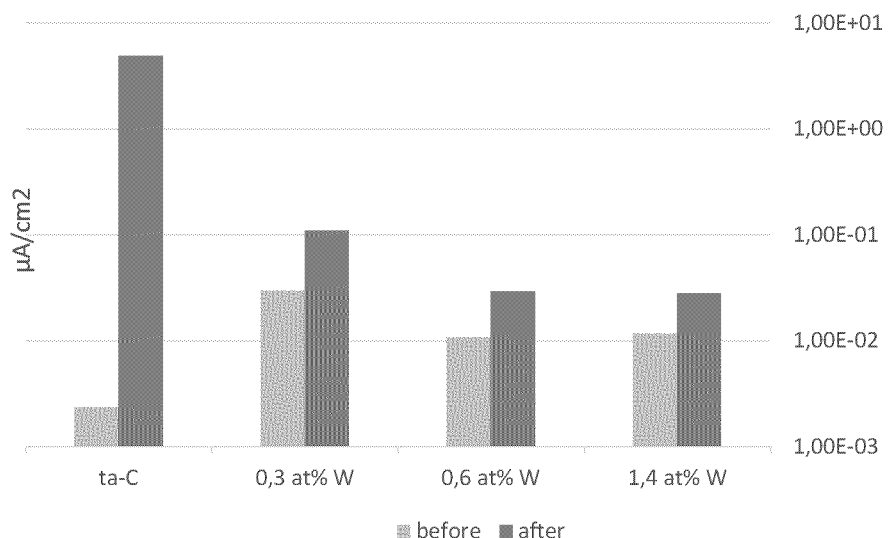
FIG. 7 shows corrosion current ($I_{corr}$) values of corrosion samples coated at 90° C. before and after the potentiostatic treatment according to specific examples of the doped DLC according to the present invention.

The corrosion currents for a ta-C coating without transition metal doping (for reference) and for coatings of the doped DLC according to the present invention (W-doped) are shown in FIG. 7. The corrosion current has increased after the potentio-static test. The dopant suppresses the corrosion current to levels an order of magnitude below the target of the US Department of Energy, which is 0.1 μA/cm².

As shown for the example of W above, the transition metal-dopant in the non-hydrogenated DLC (ta-C) according to the present invention had a positive effect on the corrosion performance and the interface contact resistance. Normally very hard ta-C coatings have a high interface contact resistance.

Based on the corrosion currents found, the lifetime expectation of the coating of the doped DLC according to the present invention under operational conditions in fuel cells and electrolyzers is over 10,000 hrs.

For studying the tribological properties of the coating of the doped DLC according to the present invention, coatings were deposited as described above, this time realizing a content of W as an example of the transition metal of 5 at. %, in terms of the W-doped DLC.

Figure 8:
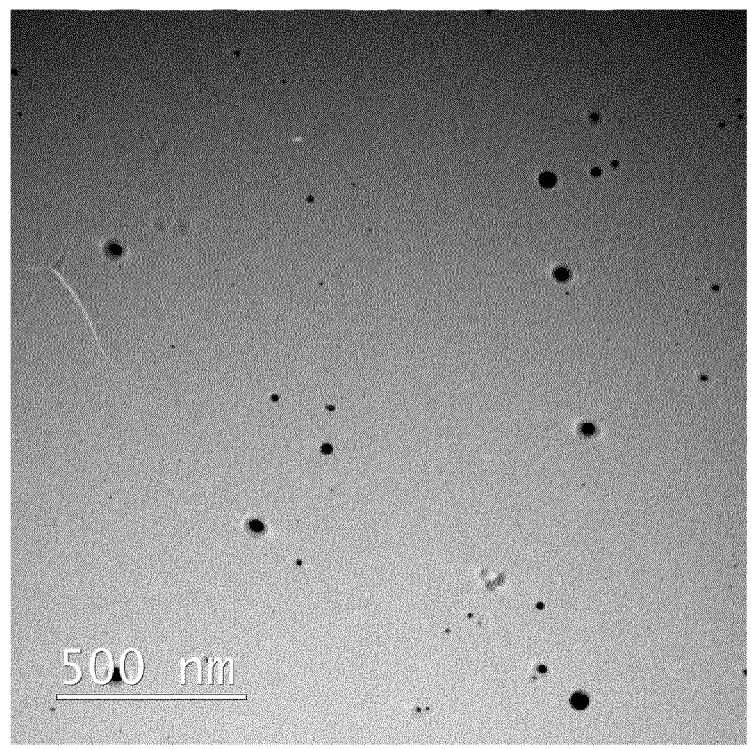
FIG. 8 is the HR-TEM bright field of 80 nm 5 at. % W doped ta-C on top of 20 nm $Si_3N_4$ according to a specific example of the doped DLC according to the present invention. The dark balls are W droplets.
Figure 9:
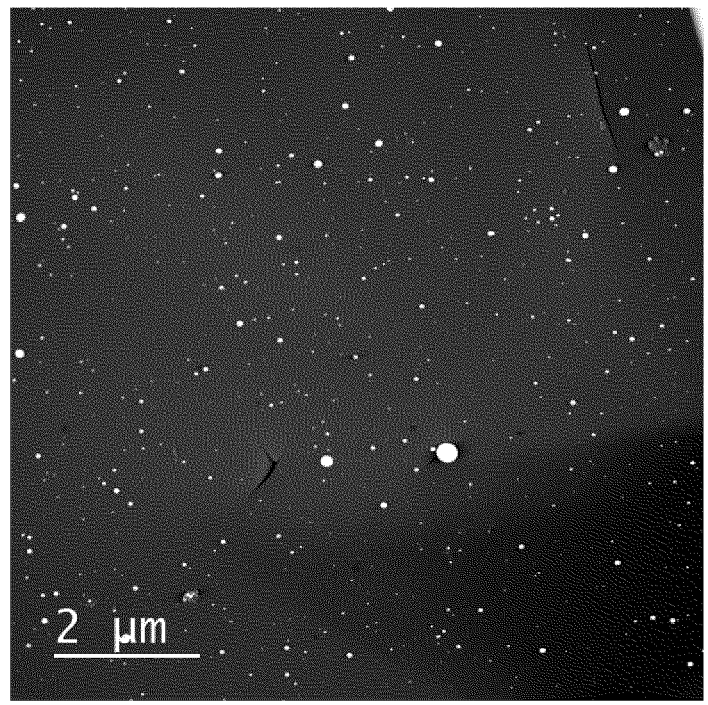
FIG. 9 is a TEM micrograph of 80 nm 5 at. % W doped ta-C in dark field mode according to a specific example of the doped DLC according to the present invention. Bright spots are pure W droplets embedded in a ta-C matrix.

Via HR-TEM and TEM, the presence of droplets of W could be confirmed for the sample doped with 5 at. % W. Typical TEM micrographs of the sample are shown in FIGS. 8 and 9. In the bright field HR-TEM image of FIG. 8, the pure W particles appear black, and in the TEM micrograph of FIG. 8 taken in dark field mode, the pure W particles appear as bright spots. The maximum particle size observed for this sample was below 250 nm. The particles were analysed by EDX showing that they are W droplets.

Figure 10:
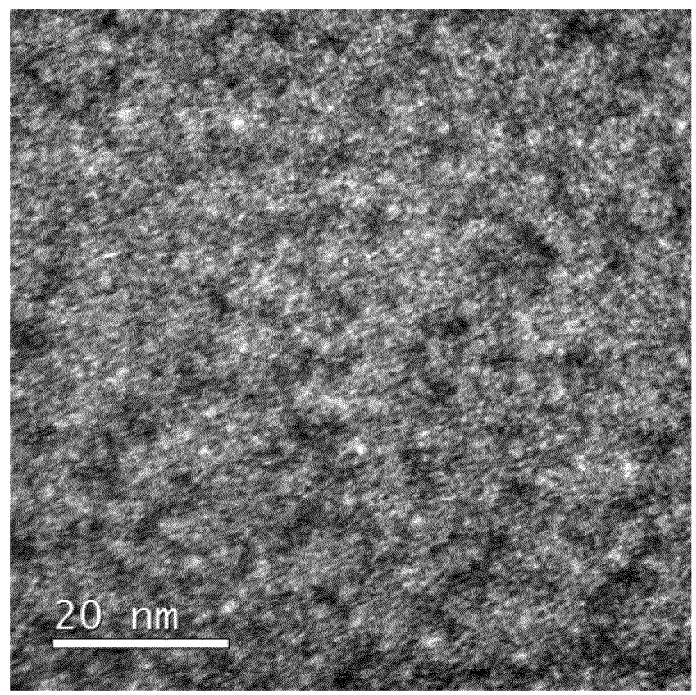
FIG. 10 is a HAADF-STEM photograph of 5 at. % W doped ta-C according to a specific example of the doped DLC according to the present invention. W shows up white as the micrograph is taken in dark field mode.
Figure 11:
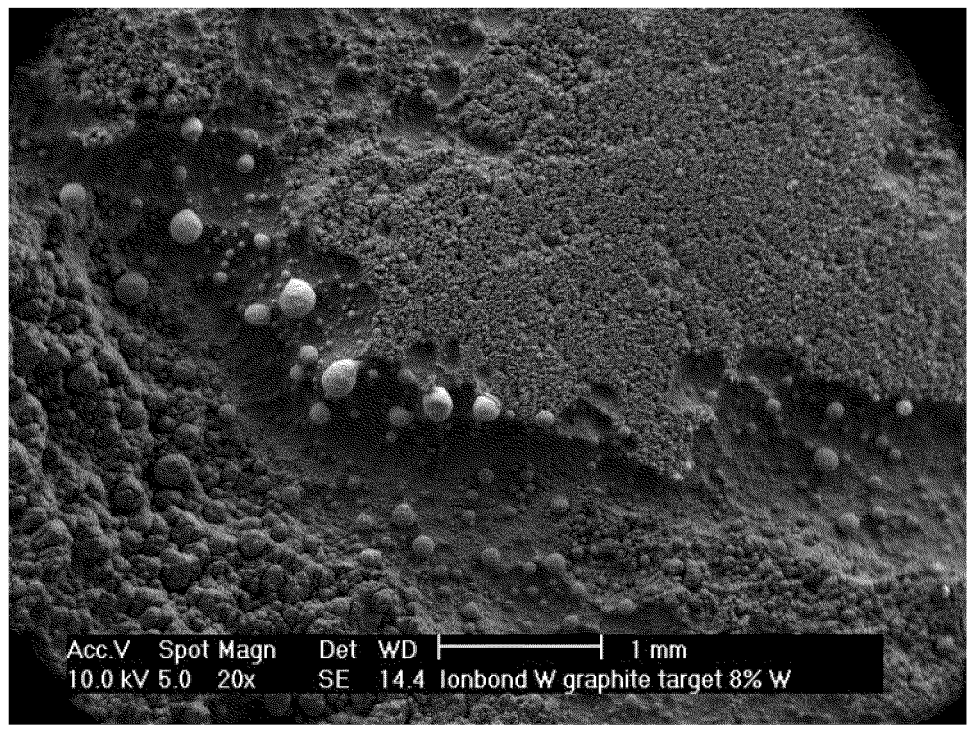
FIG. 11 is a SEM image of a graphite target comprising 8 at. % W after use in the cathodic arc discharge deposition method according to the present invention. The white droplets are W.

In FIG. 10 a HAADF-STEM image of the sample doped with 5 at. % W is shown. Sub-nm clusters of W were recognizable (in HAADF-STEM W shows up as white). It should be noted that due to the focus of the HRTEM not the total film thickness of 80 nm, but only a slot with a thickness of approximately 20 nm could be observed. Moreover, the presence of WC in the Raman spectra was confirmed as detailed above. It is thus clear that the sub-nm clusters of W are WC.

It has thus been shown that the doped DLC according to the present invention has a much higher hardness than the transition metal-doped hydrogenated DLC used in the prior art, such as by A. Abou Gharam et al. for tribological applications. Moreover, the droplets of the transition metal are shown to have a small size and are incorporated in the non-hydrogenated DLC as a matrix, so that a coating with a smooth and even surface structure can be obtained, which additionally contains droplets of the transition metal having a lubricating effect.

The invention claimed is:

1. A metallic bipolar plate comprising a metal substrate and at least one layer of a non-hydrogenated transition metal-doped diamond-like carbon (DLC) provided on the metal substrate, wherein the non-hydrogenated DLC comprises at least one transition metal selected from groups 4d, 5d and 6d of the periodic table of elements and a part of the at least one transition metal is present in the form of carbide of the at least one transition metal in the non-hydrogenated DLC as a matrix,
   characterized in that the non-hydrogenated transition metal-doped DLC has a hardness of ≥35 GPa, wherein the hardness is measured on a film of the non-hydrogenated transition metal-doped DLC deposited on a polished hardened substrate with an indentation depth less than 10% of the thickness of the film.

2. The metallic bipolar plate according to claim 1, wherein a part of the carbide of the at least one transition metal is present as islands in the non-hydrogenated DLC as a matrix.

3. The metallic bipolar plate according to claim 1, wherein at least a part of the at least one transition metal is present in the form of droplets, which metal droplets have a diameter of less than 1 μm.

4. The metallic bipolar plate according to claim 1, wherein the at least one transition metal is present in said non-hydrogenated transition metal-doped DLC in the range of 0.1 to 5 at. %.

5. The metallic bipolar plate according to claim 1, wherein the hardness is in the range of 40 GPa to 60 GPa.

6. The metallic bipolar plate according to claim 1, which has a sp3 fraction of carbon atoms of ≥60%.

7. The metallic bipolar plate according to claim 1, wherein the at least one layer of the non-hydrogenated transition metal-doped DLC has a thickness in the range of 50 nm to 3 μm.

8. A proton exchange membrane fuel cell or an electrolyzer comprising the metallic bipolar plate according to claim 1.

9. A cathodic arc discharge deposition method of depositing a coating of non-hydrogenated DLC comprising at least one transition metal selected from groups 4d, 5d and 6d of the periodic table of elements, comprising:
applying a cathode arc discharge to a carbon target doped with the at least one transition metal, wherein in the cathodic arc discharge, a direct current is superimposed with a pulsed current, wherein the pulsed current has a pulse frequency in the range of 10 kHz to 100 kHz, wherein the target is connected directly to a cathode, wherein each pulse of the pulsed current induces a rise of a voltage with a rate of more than 5 V/μs as measured on the cathode, wherein each pulse of the pulsed current has an active pulse width of less than 30 ρs.

10. The method according to claim 9, wherein the coating is a coating of the non-hydrogenated transition metal-doped DLC as defined in any one of claims 1 to 6.

11. The metallic bipolar plate according to claim 1, wherein the metal substrate is a stainless steel substrate or a titanium substrate.

12. The proton exchange membrane fuel cell or an electrolyzer of claim 8, wherein the non-hydrogenated transition metal-doped DLC has a content of the at least one transition metal in the range of 0.3 at. % to 2.5 at. %.

13. The proton exchange membrane fuel cell or an electrolyzer of claim 8, wherein the layer of the non-hydrogenated transition metal-doped DLC has a thickness of 50 nm to 1 μm.

14. The metallic bipolar plate according to claim 1, wherein a part of the carbide of the at least one transition metal is present as islands in the non-hydrogenated DLC as a matrix, wherein said islands have a size of at most 2 nm.

15. The metallic bipolar plate according to claim 1, wherein at least a part of the at least one transition metal is present in the form of droplets having a diameter of 0.1 to 100 nm.

16. The metallic bipolar plate according to claim 1, wherein at least a part of the at least one transition metal is present in the form of droplets having a diameter of 0.5 to 40 nm.

17. The metallic bipolar plate according to claim 1, which has a sp3 fraction of carbon atoms of ≥80%.

18. The method of claim 9, wherein the peak current is higher than 200 A.

19. The metallic bipolar plate according to claim 11, wherein the metal substrate is a sheet of stainless steel having a thickness of 0.05 to 0.01 mm.

20. The metallic bipolar plate according to claim 1, wherein the non-hydrogenated transition metal-doped DLC has a hardness of ≥40 GPa.

* * * * *